(12) United States Patent
Michiyama et al.

(10) Patent No.: US 11,327,745 B2
(45) Date of Patent: May 10, 2022

(54) PREVENTING FALSIFICATION IN VERSION MANAGEMENT

(71) Applicant: Panasonic Intellectual Property Corporation of America, Torrance, CA (US)

(72) Inventors: Junji Michiyama, Fukuoka (JP); Junichiro Soeda, Nara (JP); Yuji Unagami, Osaka (JP); Yuuki Hirose, Osaka (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/441,814

(22) Filed: Jun. 14, 2019

(65) Prior Publication Data
US 2019/0384594 A1 Dec. 19, 2019

Related U.S. Application Data

(60) Provisional application No. 62/686,359, filed on Jun. 18, 2018.

(30) Foreign Application Priority Data

Mar. 22, 2019 (JP) .............. JP2019-054577

(51) Int. Cl.
*G06F 8/71* (2018.01)
*H04L 9/32* (2006.01)

(52) U.S. Cl.
CPC .............. *G06F 8/71* (2013.01); *H04L 9/3236* (2013.01); *H04L 9/3247* (2013.01); *H04L 2209/38* (2013.01)

(58) Field of Classification Search
CPC ....... G06F 8/71; H04L 9/3236; H04L 9/3247; H04L 2209/38
(Continued)

(56) References Cited

U.S. PATENT DOCUMENTS 8,312,419 B2 * 11/2012 Wilcock ................... G06F 8/70
717/104
9,274,784 B2 * 3/2016 Wang ................. G06F 16/1744
(Continued)

FOREIGN PATENT DOCUMENTS

JP 2014-203352 10/2014

OTHER PUBLICATIONS

Nikitin, Kirill et al., "CHAINIAC: Proactive Software-Update Transparency via Collectively Signed Skipchains and Verified Builds", Crypto 2017, 37th International Cryptology Conference, University of California, Santa Barbara (UCSB), Aug. 2017, vol. 37, pp. 1-18 (Year: 2017).*

(Continued)

*Primary Examiner* — Lewis A Bullock, Jr.
*Assistant Examiner* — Theodore E Hebert
(74) *Attorney, Agent, or Firm* — Wenderoth, Lind & Ponack, L.L.P.

(57) ABSTRACT

The present disclosure provides a management method for software versions which prevents falsification of information under management. In the management method, a first management apparatus among management apparatuses receives transaction data from an apparatus connected through a network to the first management apparatus, the transaction data including first information on a first version of software, second information on a second version of the software subjected to version upgrade from the first version by a software developer, identification information of the software developer, and an electronic signature. The first (Continued)

management apparatus validates legitimacy of the transaction data using the electronic signature included in the transaction data received. When the transaction data is legitimate, the management apparatuses store the transaction data in distributed ledgers.

11 Claims, 30 Drawing Sheets

(58) Field of Classification Search
USPC .......................................................... 717/122
See application file for complete search history.

(56) References Cited

U.S. PATENT DOCUMENTS

| | | | |
|---|---|---|---|
| 9,336,060 B2* | 5/2016 | Nori | H04L 41/0806 |
| 10,365,922 B1* | 7/2019 | Wang | G06F 21/57 |
| 2010/0250400 A1* | 9/2010 | Fernandez | G06Q 30/0601 |
| | | | 705/26.1 |
| 2017/0046638 A1* | 2/2017 | Chan | G06Q 10/1097 |
| 2017/0046651 A1* | 2/2017 | Lin | G06F 21/645 |
| 2018/0176229 A1* | 6/2018 | Bathen | H04L 9/3247 |
| 2019/0205121 A1* | 7/2019 | Ericson | H04L 9/3239 |
| 2019/0384594 A1* | 12/2019 | Michiyama | G06F 21/64 |

OTHER PUBLICATIONS

Extended European Search Report dated Nov. 12, 2019 in corresponding European Patent Application No. 19180158.8.
Office Action dated Jun. 11, 2021 in corresponding European Patent Application No. 19180158.8.
Nikitin, Kirill et al., "CHAINIAC: Proactive Software-Update Transparency via Collectively Signed Skipchains and Verified Builds", Crypto 2017, 37th International Cryptology Conference, University of California, Santa Barbara (UCSB), Aug. 2017, vol. 37, pp. 1-18.

* cited by examiner

FIG. 10

| URL | NEW VERSION NUMBER | BASE VERSION NUMBER | SOFTWARE DEVELOPER ID |
|---|---|---|---|
| https://server.com/aaa | 1.A1 | 1 | A |
| https://server.com/bbb | 1.A2 | 1.A2 | A |
| https://server.com/ddd | 1.B1 | 1 | B |
| https://server.com/eee | 1.B2 | 1.B1 | B |
| https://server.com/ccc | 1.A3 | 1.A2 | A |
| ... | ... | ... | ... |

| URL | NEW VERSION NUMBER | BASE VERSION NUMBER | SOFTWARE DEVELOPER ID |
|---|---|---|---|
| https://server.com/aaa | 1.A1 | 1 | A |
| https://server.com/bbb | 1.A2 | 1.A1 | A |
| https://server.com/ddd | 1.B1 | 1 | B |
| https://server.com/eee | 1.B2 | 1.B1 | B |
| https://server.com/ccc | 1.A3 | 1.A2 | A |
| ... | ... | ... | ... |

| URL | NEW VERSION NUMBER | BASE VERSION NUMBER | SOFTWARE DEVELOPER ID |
|---|---|---|---|
| https://server.com/kkk | 2.F1 | 2 | F |
| https://server.com/mmm | 2.F2 | 2.F1 | F |
| https://server.com/nn | 2.G1 | 2 | G |
| ... | ... | ... | ... |

| URL | NEW VERSION NUMBER | BASE VERSION NUMBER | SOFTWARE DEVELOPER ID |
|---|---|---|---|
| https://server.com/aaa | 1.A1 | 1 | A |
| https://server.com/bbb | 1.A2 | 1.A1 | A |
| https://server.com/ddd | 1.B1 | 1 | B |
| https://server.com/eee | 1.B2 | 1.B1 | B |
| https://server.com/ccc | 1.A3 | 1.A2 | A |
| — | (REMOVED) | 1.A2 | Z |
| — | (REMOVED) | 1.B1 | Z |

PREVENTING FALSIFICATION IN VERSION MANAGEMENT

CROSS REFERENCE TO RELATED APPLICATIONS

This application claims the benefit of priority of Japanese Patent Application Number 2019-054577 filed on Mar. 22, 2019, and U.S. Provisional Patent Application No. 62/686,359 filed on Jun. 18, 2018, the entire contents of which are hereby incorporated by reference.

BACKGROUND

1. Technical Field

The present disclosure relates to management methods, management apparatuses, and programs.

2. Description of the Related Art

In management systems which manage software, the version information indicating versions of software developed by software developers is managed along with the identification information of the software developer (for example, see Japanese Unexamined Patent Application Publication No. 2014-203352).

SUMMARY

Unfortunately, traditional management systems have difficulties in preventing the falsification of the information under management by management servers.

An object of the present disclosure is to provide a management method for software versions which prevents the falsification of the information under management.

A management method according to one aspect of the present disclosure is a management method for software versions, the management method to be executed by a version management system, the management method including: receiving, by a first management apparatus among management apparatuses which are included in the version management system and have distributed ledgers, transaction data from an apparatus connected through a network to the first management apparatus, the transaction data including first information on a first version of software, second information on a second version of the software subjected to version upgrade from the first version by a software developer, identification information of the software developer, and an electronic signature; validating, by the first management apparatus, legitimacy of the transaction data using the electronic signature included in the transaction data received; and storing, by each of the management apparatuses, the transaction data in a corresponding distributed ledger among the distributed ledgers when the transaction data is legitimate.

These comprehensive or specific aspects may be implemented with systems, methods, integrated circuits, computer programs, or recording media such as computer-readable CD-ROMs, or may be implemented with any combination of systems, methods, integrated circuits, computer programs, and recording media.

The present disclosure provides a management method for software versions to prevent falsification of information under management.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10 is a diagram illustrating an example of transaction data stored in a blockchain according to Embodiment 1;

FIG. 17 is a first diagram illustrating transaction data stored in a blockchain according to Embodiment 2;

FIG. 18 is a second diagram illustrating transaction data stored in the blockchain according to Embodiment 2;

FIG. 26 is a diagram illustrating transaction data stored in a blockchain according to Embodiment 3;

Figure 1:
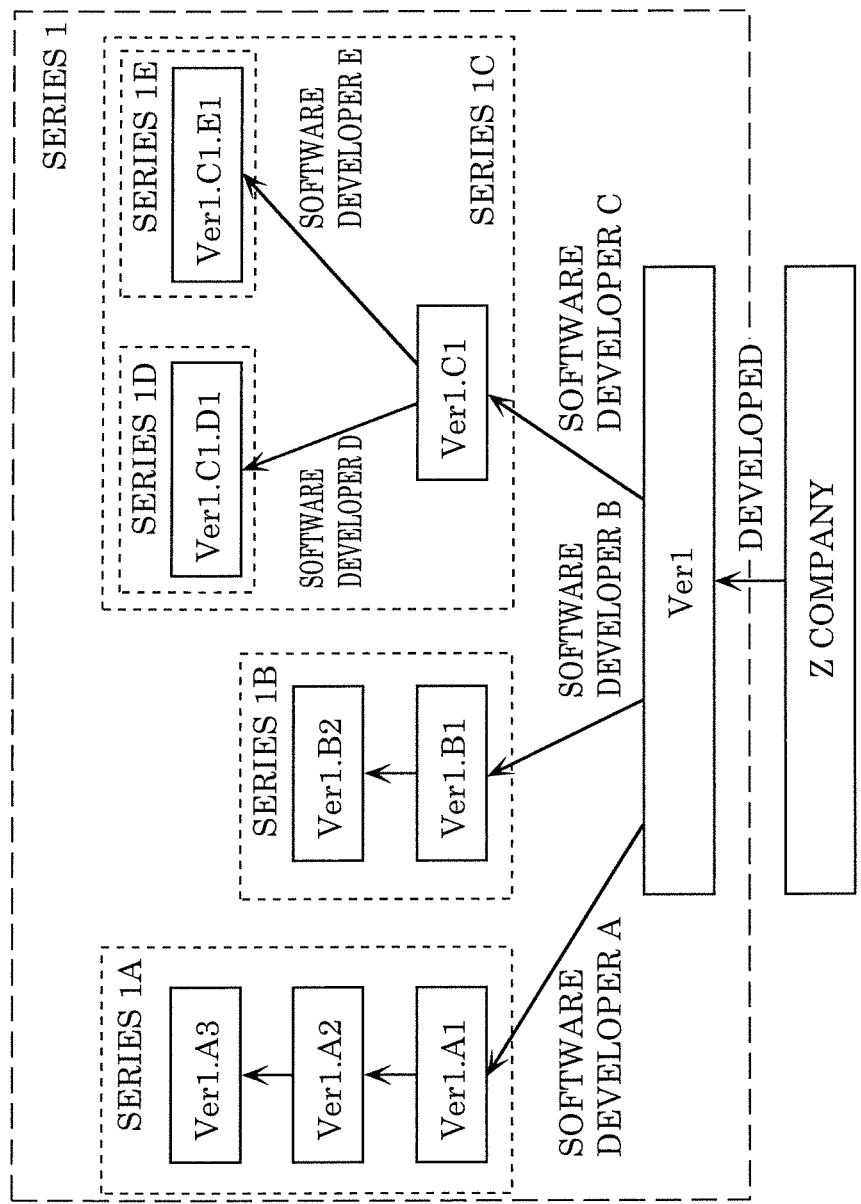
FIG. 1 is a diagram illustrating a version series of software in agile development.

DETAILED DESCRIPTION OF THE EMBODIMENTS (Underlying Knowledge Forming Basis of the Present Disclosure)

The present inventor has found that the following problem occurs in the development of software described in "BACKGROUND".

The software is developed by agile development in which not only software developing companies but also many unspecified software developers participate. Such a form of development may generate a variety of version series by improving the software by a large number of software developers.

In a management system which manages software, the version information indicating versions of software developed by the software developers are managed along with the identification information of the software developers (for example, see Japanese Unexamined Patent Application Publication No. 2014-203352).

Here, the version information has a role to uniquely specify the version of the software. The identification information of the software developer may be used to provide a reward the software developer about the development of a new version of the software.

Unfortunately, traditional management systems have difficulties in preventing the falsification of the version information of a program managed by a management server or the identification information of the software developer.

Accordingly, the present disclosure provides a management method of preventing the falsification of the information under management.

The management method according to one aspect the present disclosure is a management method for software versions, the management method to be executed by a version management system, the management method including: receiving, by a first management apparatus among management apparatuses which are included in the version management system and have distributed ledgers, transaction data from an apparatus connected through a network to the first management apparatus, the transaction data including first information on a first version of software, second information on a second version of the software subjected to version upgrade from the first version by a software developer, identification information of the software developer, and an electronic signature; validating, by the first management apparatus, legitimacy of the transaction data using the electronic signature included in the transaction data received; and storing, by each of the management apparatuses, the transaction data in a corresponding distributed ledger among the distributed ledgers when the transaction data is legitimate.

According to the aspect above, the information on the software developer who has updated the version of the software is managed by the distributed ledger. The distributed ledger is advantageous in obstructing the falsification of the possessed information and in reducing influences by system failures. Accordingly, the management method above can prevent the falsification of the information under management.

For example, the second information may include a version number of the second version. The management method may further include: transmitting a new version number to the apparatus as the version number of the second version when a request to issue the version number of the second version has been received from the apparatus before the receiving; and receiving transaction data including, as the second information, the new version number transmitted to the apparatus in the receiving.

According to the aspect above, the version number of the new version is issued, and the information on the software developer of the new version is managed in correspondence with the issued version number. Failures such as duplication of the version number may occur when the version number is assigned by an apparatus different from the version management system. The management method according to the present disclosure can prevent such failures of the version number and prevent the falsification of the information under management.

For example, the first information may include a version number of the first version, and the second information may include a hash value of the second version and the version number of the second version.

According to the aspect above, the prevention in falsification of the information under management can be further facilitated using the version number of the first version, the hash value of the second version, and the version number of the second version.

For example, the first information may include a hash value of the first version, and the second information may include a hash value of the second version.

According to the aspect above, the prevention in falsification of the information under management can be further facilitated using the hash value of the first version and the hash value of the second version.

For example, the first information may include a hash value of the first version, and the second information may include a hash value of a difference between the first version and the second version.

According to the aspect above, the prevention in falsification of the information under management can be further facilitated using the hash value of the first version and the hash value of the difference between the first version and the second version.

For example, the apparatus may possess location information indicating a location where the second version is stored. In the management method, transaction data including the location information may be received in the receiving.

According to the aspect above, the information indicating the location where the software of the second version is stored is stored in the distributed ledger together with the information on the software developer. Accordingly, further, the falsification of the information under management can be prevented while the falsification of the information on the location where the second version is stored is also prevented.

For example, in the management method, when a second version series of the software is branched from a first version series of the software, a new distributed ledger having one or more versions including at least the latest version of the first version series as one or more versions of the second version series may be generated, and the management apparatuses may have the new distributed ledger.

According to the aspect above, the distributed ledgers corresponding to several version series are managed, and a distributed ledger corresponding to a new series is generated during branching of the version series. When a large number of version upgrades are performed in one series, the information corresponding to those version upgrades may be obtained when the information such as the history of version upgrade is obtained, increasing the processing load. In such a case, the version series is branched, and the new version series is managed by the new distributed ledger, thereby reducing the information such as the history of version upgrade and preventing the increase in processing load.

For example, in the receiving, it may be specified whether the transaction data is derived from the first version series or the second version series, and the transaction data received may be stored in a distributed ledger corresponding to a version series corresponding to the transaction data specified, among the first version series and the second version series.

According to the aspect above, when several version series are managed according to several distributed ledgers, the version series to which the transaction data belongs can be specified, and the transaction data can be managed according to its appropriate distributed ledger.

For example, the management method may further include: generating transaction data indicating removal of one version series when removing the one version, and storing the transaction data generated in a distributed ledger corresponding to the one version series.

According to the aspect above, the version series can be appropriately removed using the predetermined transaction data. Accordingly, the prevention in falsification of the information under management can be further facilitated, and further, the removal of the version series is implemented.

For example, the management method may further include providing a token to the software developer with reference to the transaction data stored in the distributed ledger.

According to the aspect above, a token is provided to the software developer of the new version based on the transaction data so far. Because the falsification of the transaction data stored in the distributed ledger is difficult, provision of the token to an inappropriate person who spoofs the software developer can be prevented. Thus, the falsification of the information under management can be prevented, preventing inappropriate provision of the token.

For example, the distributed ledgers may be blockchains, and when the transaction data is legitimate, the management apparatuses may store the transaction data in the blockchains.

According to the aspect above, the prevention in falsification of the information under management can be further facilitated by using blockchains as distributed ledgers by management apparatuses.

A management apparatus according to one aspect of the present disclosure is a first management apparatus among management apparatuses which are included in a version management system for managing software versions and have distributed ledgers. The management apparatus includes: a transaction validator which receives transaction data from an apparatus connected through a network to the first management apparatus, the transaction data including first information on a first version of software, second information on a second version of the software subjected to version upgrade from the first version by a software developer, identification information of the software developer, and an electronic signature, and validates legitimacy of the transaction data using the electronic signature included in the transaction data received; and a ledger manager which stores the transaction data in the distributed ledgers when the transaction data is legitimate.

Such a configuration achieves the same effect as that in the management method.

A management apparatus according to one aspect of the present disclosure is a program for operating a computer as a first management apparatus among management apparatuses which are included in a version management system for managing software versions and have distributed ledgers. The program includes: receiving transaction data from an apparatus connected through a network to the first management apparatus, the transaction data including first information on a first version of software, second information on a second version of the software subjected to version upgrade from the first version by a software developer, identification information of the software developer, and an electronic signature; validating legitimacy of the transaction data using the electronic signature included in the transaction data received; and storing the transaction data in the distributed ledgers when the transaction data is legitimate.

Such a configuration achieves the same effect as that in the management method above.

These comprehensive or specific aspects may be implemented with systems, methods, integrated circuits, computer programs, or recording media such as computer-readable CD-ROMs, or may be implemented with any combination of systems, methods, integrated circuits, computer programs, or recording media.

Embodiments will now be specifically described with reference to the drawings.

The embodiments described below all are comprehensively or specifically illustrative. Numeric values, shapes, materials, components, arrangements, positions, and connection forms thereof, steps, order of steps, and the like described in the following embodiments are exemplary, and should not be construed as limitative to the present disclosure. Among the components of the embodiments below, the components not described in an independent claim representing the most superordinate concept of the present disclosure are described as arbitrary components.

Embodiment 1

In the present embodiment, a management method for software versions will be described, which prevents the falsification of the information under management. Here, the software is, for example, software which is installed in a home appliance (such as a laundry machine, an air conditioner, a refrigerator, or a television set) to control the operation of the home appliance and demonstrate the function of the home appliance.

FIG. 1 is a diagram illustrating a version series of software in agile development.

As illustrated in FIG. 1, in the agile development, a software development company (Z Company) develops a first version, i.e., version 1 (represented as "Ver1" in the drawing, the same applies below), and provides Ver1 to the community of software developers. Based on the software of version 1 provided, the software developers belonging to the community then perform development to generate a variety of version series. Different software programs having different functions are developed in the version series, for example. The version series is represented as series 1A in FIG. 1. The version series includes one or more versions.

As illustrated in FIG. 1, based on the software of version 1, version 1.A1 is generated through the development by software developer A, version 1.B1 is generated through the development by software developer B, and version 1.C1 is generated through the development by software developer C.

Further development may be performed based on these versions. For example, version 1.A2 is developed based on version 1.A1, and version 1.A3 is developed based on version 1.A2. Version 1.B2 is developed based on version 1.B1. Based on version 1.C1, software developers D and E develop versions 1.C1.D1 and 1.C1.E1 as version series.

Here, the versions of and after version 1.A1 (i.e., version 1.A1 and versions 1.A2 and 1.A3 which are versions developed based on version 1.A1) are referred to as series 1A. Similarly, the versions of and after version 1.B1 are referred to as series 1B. Version 1.C1 is referred to as series 1C, version 1.C1.D1 is referred to as series 1D, and version 1.C1.E1 is referred to as series 1E. The series including version 1 and all the versions of series 1A to 1E is referred to as series 1 in some cases.

As described above, in the agile development, software developers different from the software development company develop software based on the software provided by the software development company (Z Company), generating several version series.

Among these versions, a version which a user desires is provided to the user. For example, the latest version of the version series having the functions which the user desires is provided to the user.

Figure 2:
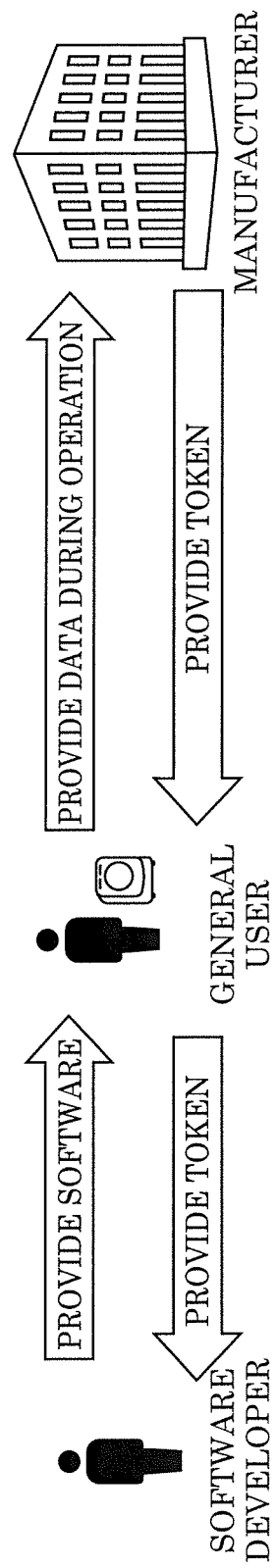
FIG. 2 is a diagram illustrating transmission and reception of a token in the agile development.

FIG. 2 is a diagram illustrating transmission and reception of a token in the agile development. Here, the token represents a concept corresponding to a profit or value, and may be possessed and transferred by a person (natural person) or a manufacturer (legal person). In the agile development, the development of the software is advanced by appropriately transferring tokens between a software developer, a general user, and a manufacturer.

For example, the general user receives the software provided by the software developer. The user operates the home appliance by operating the software on the home appliance possessed by the user. The general user provides a token to the software developer in exchange for the software provided.

The general user provides the data of the product, which is obtained when the home appliance having the software installed therein is operated, to the manufacturer, and receives a token in exchange for the data.

Here, the token is directly transferred between the general user and the software developer without the manufacturer interposed therebetween. When such transfer of the token occurs, the identification information of the software developer under management may be falsified for the purpose of dishonestly obtaining a profit or impairing profits of others in some cases. The falsified identification information enables the following behaviors: A malicious person may spoof the software developer to receive the token, or may spoof another person to provide malicious software and damage the reputation of the software developer.

The management system according to the present embodiment aims at preventing the falsification of information under management.

Figure 3:
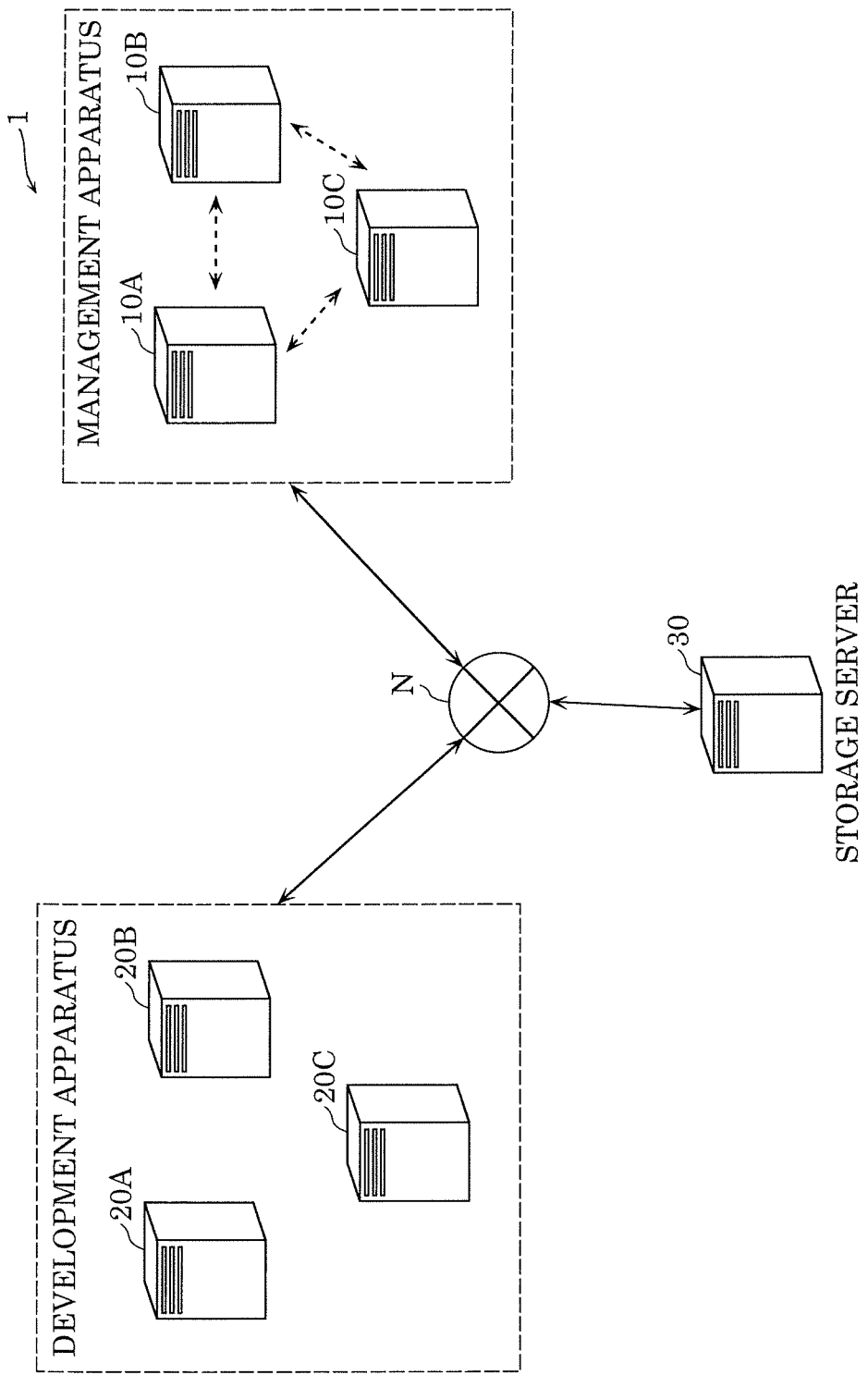
FIG. 3 is a diagram illustrating a configuration of a management system according to Embodiment 1.

FIG. 3 is a diagram illustrating a configuration of management system 1 according to Embodiment 1.

As illustrated in FIG. 3, management system 1 includes management apparatuses 10A, 10B, and 10C, development apparatuses 20A, 20B, and 20C, and storage server 30. These apparatuses are communicably connected to each other through network N.

Management apparatuses 10A, 10B, and 10C (also referred to as management apparatuses 10A and others) are management apparatuses which manage the information on the versions of software by computers. Although an example of three management apparatuses 10A and others will be described, the number of management apparatuses may be two or more. Management apparatuses 10A and others are communicably connected to each other. Management apparatuses 10A and others each correspond to a first management apparatus. Although management apparatus 10A is used as a representative of management apparatuses 10A and others in the following description in some cases, the same also applies to other management apparatuses 10B and 10C. Management apparatuses 10A and others can also communicate through network N.

Management apparatuses 10A and others each have a distributed ledger for managing the information on the version of software. Management apparatuses 10A and others update the distributed ledgers of their own while synchronizing with each other through communication. When one of management apparatuses 10A and others obtains the information on a new version from one of development apparatuses 20A and others, management apparatuses 10A and others each have a copy of the obtained information. In general, the distributed ledger is advantageous in obstructing the falsification of the possessed information and in reducing influences by the system failures.

Development apparatuses 20A, 20B, and 20C (also referred to as development apparatuses 20A and others) are computers used by a software developer of the software, and each independently operate. Although an example of three development apparatuses 20A and others will be described, the number of development apparatuses may be one or more. Although development apparatus 20A is used as a representative of development apparatuses 20A and others in the following description, the same also applies to other development apparatus 20B and 20C.

The software developer develops a new version of the software using development apparatus 20A, and transmits the developed software of the new version to storage server 30 to store the software in storage server 30. Development apparatus 20A also transmits the information on the new version developed by the software developer through network N to one of management apparatuses 10A and others.

Storage server 30 is a computer which stores the software. Storage server 30 stores one or more versions of the software in a memory device.

Network N is a communication line which communicably connects management apparatuses 10A and others, development apparatus 20A, and storage server 30 to each other. Any communication line can be used. Any combination of wired networks with wireless networks may be used. Network N may partially include the Internet.

Storage server 30, development apparatuses 20A and others, and management apparatuses 10A and others will now be described in more detail.

Figure 4:
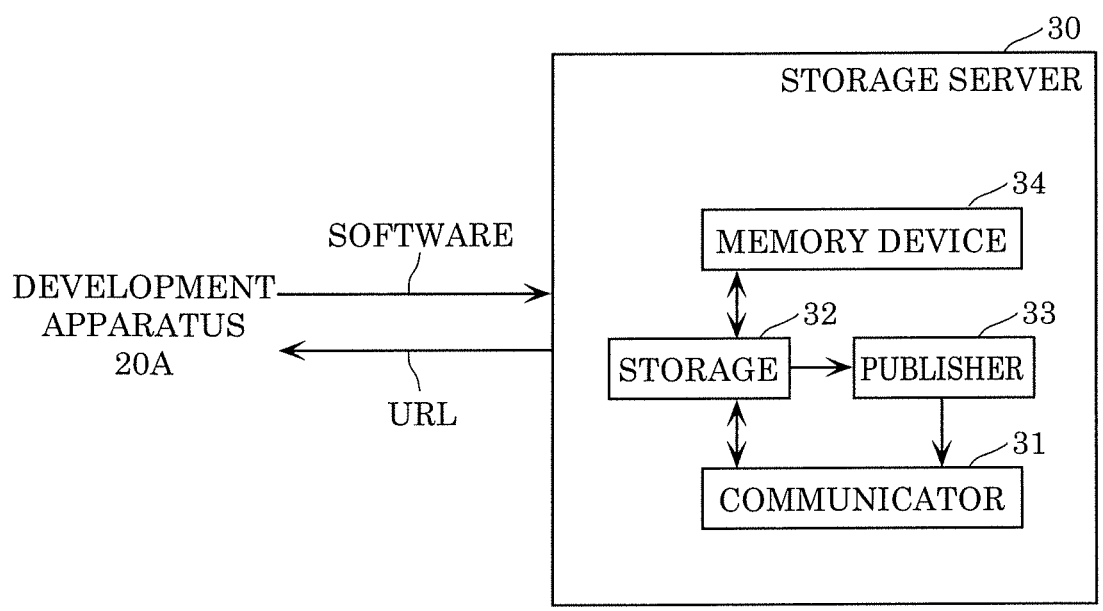
FIG. 4 is a block diagram illustrating a configuration of a storage server according to Embodiment 1.

FIG. 4 is a block diagram of a configuration of storage server 30 according to the present embodiment.

As illustrated in FIG. 4, storage server 30 includes communicator 31, storage 32, publisher 33, and memory device 34. The functions of storage server 30 can be implemented by a processor which executes a predetermined program using a memory.

Communicator 31 is a communication interface device connected to network N. Storage server 30 can communicate with development apparatus 20A through communicator 31.

Storage 32 is a processor which stores the software using memory device 34. Storage 32 obtains the software of the new version from development apparatus 20A through communicator 31, and stores the obtained software in memory device 34. Storage 32 also reads the software stored in memory device 34 in response to a request from a user.

Publisher 33 is a processor which publishes location information indicating the location where the software is stored. In the case where storage 32 stores the software in memory device 34, publisher 33 obtains the information indicating the location where the software is stored, and generates and publishes the location information indicating the location. Publisher 33 notifies development apparatus 20A of the generated location information.

The location information is, for example, a uniform resource locator (URL) indicating a position on the Internet of an electric file related with the software in memory device 34. This case will now be described below as an example. The URL includes the information of the path indicating the location in memory device 34 and the file name, and the host name of storage server 30, for example.

Memory device 34 is a memory device in which the software is stored. Memory device 34 stores one or more versions of the software. The software is stored in memory device 34 by storage 32, and is read therefrom by storage 32.

Figure 5:
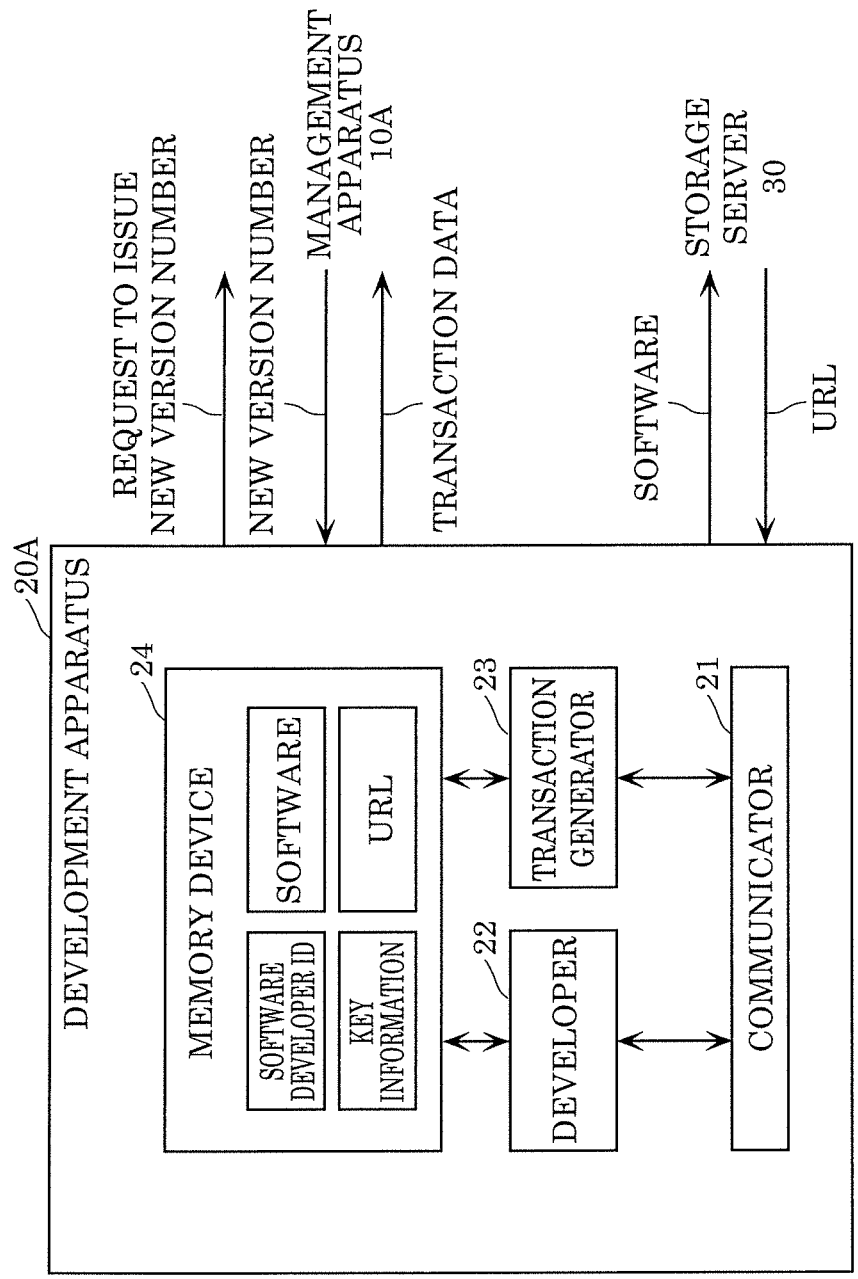
FIG. 5 is a block diagram illustrating a configuration of a development apparatus according to Embodiment 1.

FIG. 5 is a block diagram illustrating a configuration of development apparatus 20A according to the present embodiment. Development apparatuses 20B and 20C also have the same configuration, and each independently operate.

As illustrated in FIG. 5, development apparatus 20A includes communicator 21, developer 22, transaction generator 23, and memory device 24. The functions of development apparatus 20A can be implemented by a processor which executes a predetermined program using a memory.

Communicator 21 is a communication interface device connected to network N. Development apparatus 20A can communicate with storage server 30 and management apparatus 10A through communicator 21.

Developer 22 is a processor which generates a new version of the software developed by the software developer based on the operation by a user or the function of a tool for developing software. Developer 22 specifically has software (or program or program codes) of a version (corresponding to a first version) underlying the development of the software, and generates a new version (corresponding to second version) of the software based on the possessed software. Thus, the software developer develops the new version of the software using development apparatus 20A (specifically, developer 22). The development of the new version is also referred to as version upgrade. Developer 22 transmits the developed software of the new version through communicator 21 to storage server 30 to store the software in storage server. At this time, storage server 30 (specifically, publisher 33) notifies developer 22 of the URL indicating the location of the software stored in storage server 30.

Transaction generator 23 is a processor which generates transaction data including the information on the version of the software. The transaction data includes at least information on a first version of the software (corresponding to first information), information on a second version obtained through version upgrade of the first version by the software developer (corresponding to second information), a software developer ID as an identification information of the software developer, and the electronic signature of the software developer. The electronic signature of the software developer is generated from the information included in the transaction data through encryption with the private key of the software developer. The identification information of the software developer and the private key thereof can be obtained by reading these from memory device 24 by transaction generator 23. Transaction generator 23 transmits the generated transaction data through communicator 21 to management apparatus 10A.

Transaction generator 23 also generates a request to issue a new version number, and transmits the request to management apparatus 10A. Transaction generator 23 receives the notification of the new version number in reply.

Memory device 24 is a memory device which stores the information on the software developer and the information on the software. The information on the software developer includes a software developer ID as the identification information of the software developer, and key information of the software developer (including the private key). The software developer ID is information which enables unique identification of the software developer. The information on the software includes a body of software, and the URL indicating the location in storage server 30 where the software is stored. Here, the body of software indicates a software program, and is simply represented as "software" in FIG. 5. The body of software stored in memory device 24 is read by developer 22. The software developer ID, the key information, and the URL stored in memory device 24 are read by transaction generator 23.

Figure 6:
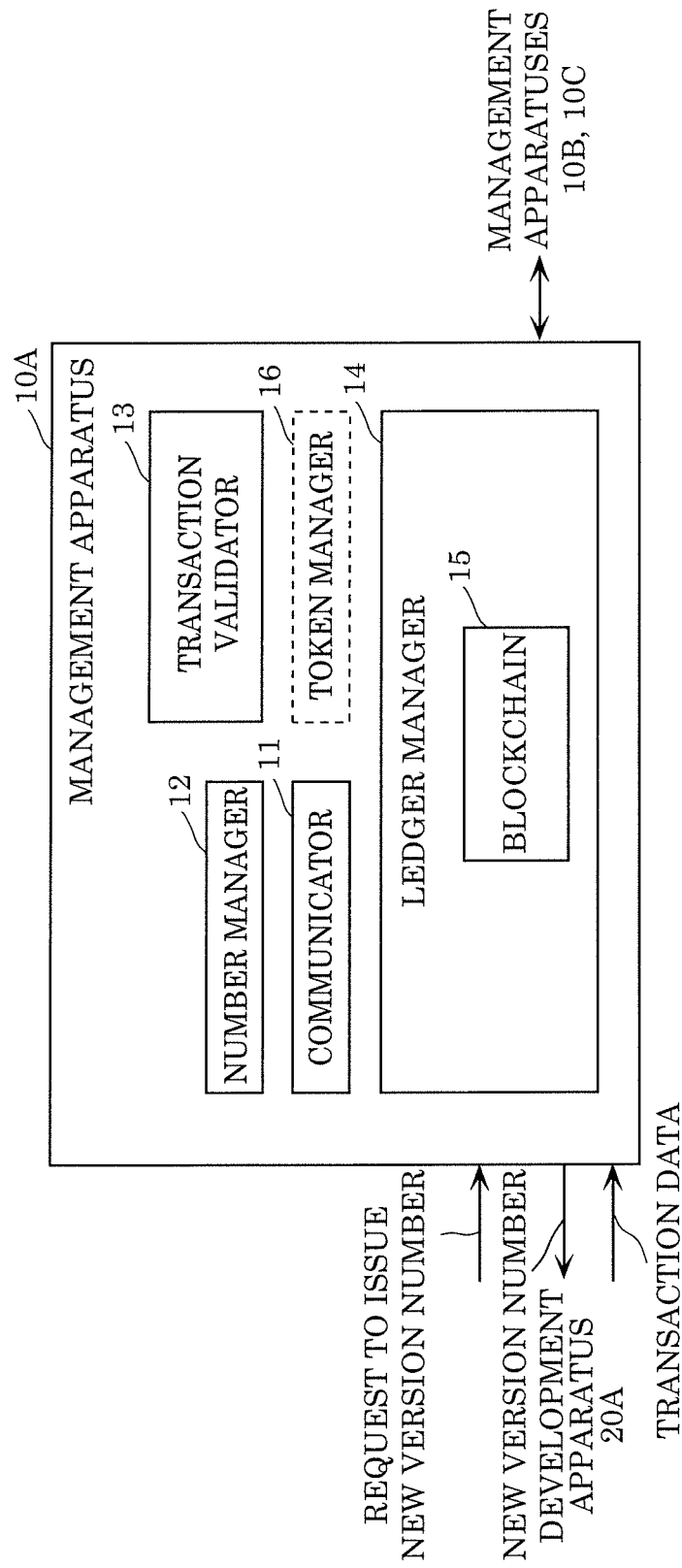
FIG. 6 is a block diagram illustrating a configuration of a management apparatus according to Embodiment 1.

FIG. 6 is a block diagram illustrating a configuration of management apparatus 10A according to the present embodiment.

As illustrated in FIG. 6, management apparatus 10A includes communicator 11, number manager 12, transaction validator 13, ledger manager 14, and token manager 16. The functions included in management apparatus 10A can be implemented by a processor which executes a predetermined program using a memory.

Communicator 11 is a communication interface device connected to network N. Management apparatus 10A can communicate with development apparatus 20A and other management apparatuses 10B and 10C through communicator 11.

Number manager 12 is a processor which manages the version number of the version of the software. When receiving a request to issue a new version number of the software from development apparatus 20A, number manager 12 issues the new version number according to the request, and notifies development apparatus 20A of the request. Among the versions currently possessed, number manager 12 issues a version number advanced from the version number of the latest version. In the case where the version has several series, number manager 12 receives a request to issue a new version number for each series, and issues a version number for each series.

Here, the version number is set according to predetermined rules. For example, the version number is set using numeric values such that a more advanced version (that is, a version more repeatedly subjected to version upgrade) has a greater numeric value. At this time, letters may also be used in combination with numeric values. Here, an example where the version series is represented with letters will be illustrated. In other words, the versions included in series 1A developed based on the first version, i.e., version 1 are referred to as version 1.A1, version 1.A2, version 1.A3, and the like. The versions included in series 1B developed based on version 1 separately from series 1A are referred to as version 1.B1, version 1.B2, and the like.

Transaction validator 13 is a processor which validates the legitimacy of the transaction data. Transaction validator 13 receives the transaction data through communicator 11 from development apparatus 20A. The transaction data to be received includes first information on the first version of the software, second information on the second version of the software obtained through version upgrade of the first version by the software developer, the identification information of the software developer, and the electronic signature of the software developer. When receiving the transaction data, transaction validator 13 validates the legitimacy of the transaction data using the electronic signature included in the received transaction data. The legitimacy of the transaction data is validated using the information included in the transaction data and the public key of the software developer to determine the legitimacy of the transaction data. More specifically, it is determined that the transaction data is surely generated by development apparatus 20A and the transaction data has not been falsified from the generation. The validation of the legitimacy of the transaction data is also simply referred to as validation of the transaction data.

The transaction data received by transaction validator 13 may include a new version number notified by number manager 12.

The transaction data received by transaction validator 13 may further include the URL or location information of the software of the new version.

Ledger manager 14 is a processor which manages the distributed ledger for managing the versions of software. Although an example where the distributed ledger is blockchain 15 will be described here, another type of distributed ledger (such as IOTA or a hashgraph) may also be used.

In the case where transaction validator 13 validates the transaction data, ledger manager 14 synchronizes the transaction data through the transmission of the transaction data to other management apparatuses 10B and 10C. Ledger manager 14 then executes a consensus algorithm between management apparatus 10A and other management apparatuses 10B and 10C. In the case where an agreement is generated by the consensus algorithm, a block including the transaction data is generated, and the generated block is stored in blockchain 15.

Although one example of consensus algorithms is Practical Byzantine Fault Tolerance (PBFT), any other consensus algorithms such as Proof of Work (PoW) or Proof of Stake (PoS) may also be used.

Token manager 16 is a processor which manages tokens possessed by the user and the software developer. Token manager 16 provides a token to the software developer with reference to the transaction data stored in blockchain 15. Token manager 16 may use blockchains for management of tokens.

Three examples of a configuration of transaction data which allows management apparatuses 10A and others to manage the new version of the software will now be illustrated.

Figure 7:
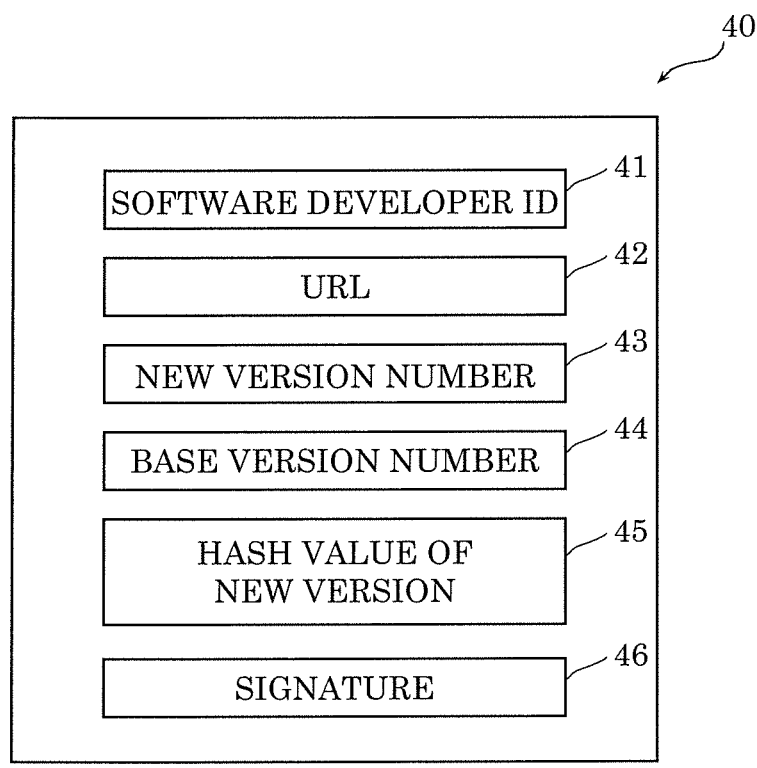
FIG. 7 is a diagram illustrating a first example of transaction data according to Embodiment 1.

FIG. 7 is a diagram illustrating transaction data 40 as a first example of the transaction data according to the present embodiment. Transaction data 40 is an example where the first information on the first version of software includes the version number of the first version and the second information on the second version of software includes a hash value of the second version and the version number of the second version.

As illustrated in FIG. 7, transaction data 40 includes software developer ID 41, URL 42, new version number 43, base version number 44, hash value 45 of the new version, and signature 46.

Software developer ID 41 is the identification information of the software developer who has developed the new version to be newly managed according to transaction data 40.

URL 42 is an URL indicating the location where the new version to be newly managed according to transaction data 40 is stored. URL 42 indicates the location in memory device 34 of storage server 30 where the software of the new version is stored.

New version number 43 is a version number of the new version to be newly managed according to transaction data 40.

Base version number 44 is a version number of the version (also referred to as base version) underlying the new version to be newly managed according to transaction data 40.

Hash value 45 of the new version is a hash value obtained through a hash operation performed on all the programs of the new version to be newly managed according to transaction data 40 or predetermined part of the programs.

Signature 46 is an electronic signature generated from the information included in transaction data 40 through encryption with the private key of the software developer. Specifically, signature 46 is a value obtained as follows: A hash value is obtained by performing a hash operation on the information including software developer ID 41, URL 42, new version number 43, base version number 44, and hash value 45 of the new version, and is encrypted with the private key of the software developer.

Figure 8:
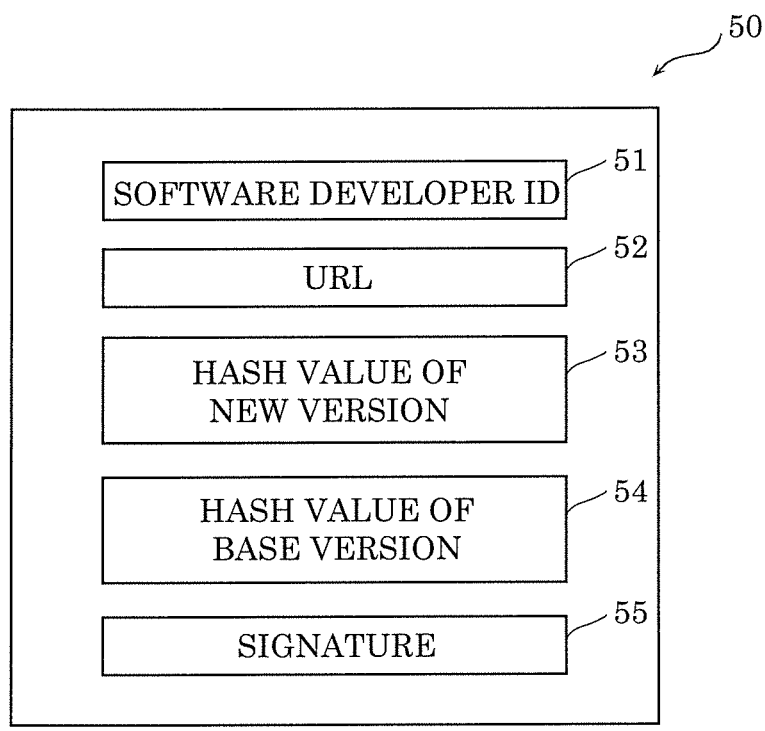
FIG. 8 is a diagram illustrating a second example of transaction data according to Embodiment 1.

FIG. 8 is a diagram illustrating transaction data 50 as a second example of the transaction data according to the present embodiment. Transaction data 50 is an example where the first information on the first version of software includes the hash value of the first version of the software and the second information on the second version of the software includes the hash value of the second version of the software.

As illustrated in FIG. 8, transaction data 50 includes software developer ID 51, URL 52, hash value 53 of the new version, hash value 54 of the base version, and signature 55.

Software developer ID 51 and URL 52 are the same as those in transaction data 40.

Hash value 53 of the new version is a hash value obtained by the hash operation performed on all the programs of the new version of the software to be newly managed according to transaction data 50 or predetermined part of the programs.

Hash value 54 of the base version is a hash value obtained by the hash operation performed on all the programs of the base version of the software underlying the new version of the software to be newly managed according to transaction data 50 or predetermined part of the programs.

Signature 55 is an electronic signature generated from the information included in transaction data 50 through encryption with the private key of the software developer. Specifically, signature 55 is a value obtained as follows: A hash value is obtained by performing a hash operation on the information including software developer ID 51, URL 52, hash value 53 of the new version, and hash value 54 of the base version, and is encrypted with the private key of the software developer.

Figure 9:
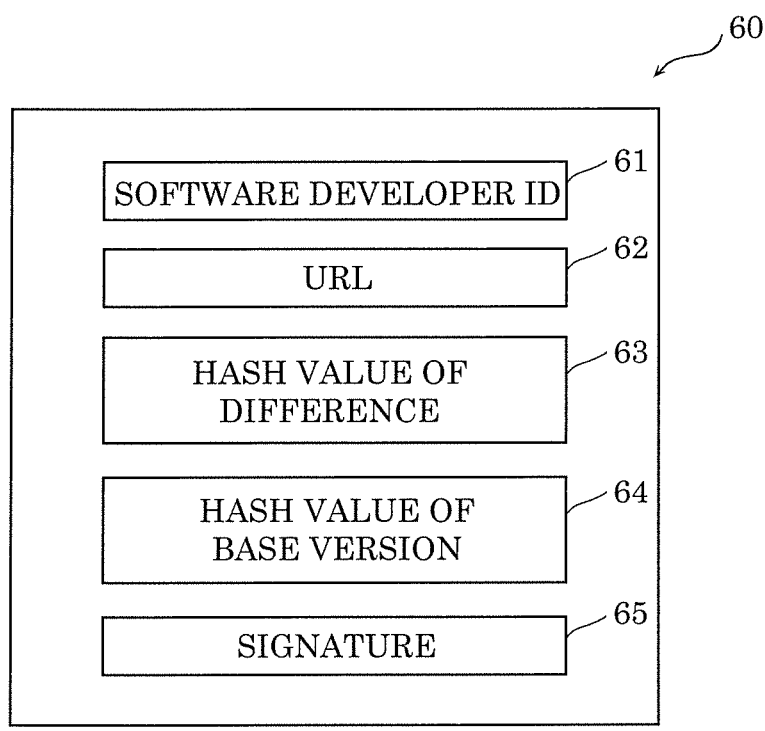
FIG. 9 is a diagram illustrating a third example of transaction data according to Embodiment 1.

FIG. 9 is a diagram illustrating transaction data 60 as a third example of the transaction data according to the present embodiment. Transaction data 60 is an example where the first information on the first version of software includes the hash value of the first version of the software, and the second information on the second version of the software includes the hash value of the difference between the first version of the software and the second version thereof.

As illustrated in FIG. 9, transaction data 60 includes software developer ID 61, URL 62, hash value 63 of the difference, hash value 64 of the base version, and signature 65.

Software developer ID 61 and URL 62 are the same as those in transaction data 40.

Hash value 63 of the difference is a hash value of the difference between a new version of the program to be newly managed according to transaction data 60 and a base version of the program underlying the development of the new version.

Hash value 64 of the base version is a hash value obtained through a hash operation performed on all the programs in the new version of the software to be newly managed according to transaction data 60 or predetermined part of the programs.

Signature 65 is an electronic signature generated from the information included in transaction data 60 through encryption with the private key of the software developer. Specifically, signature 65 is a value obtained as follows: A hash value is obtained by performing a hash operation on the information including software developer ID 61, URL 62, hash value 63 of the difference, and hash value 64 of the base version, and is encrypted with the private key of the software developer.

The transaction data stored in blockchain 15 will now be described.

FIG. 10 is a diagram illustrating an example of the transaction data stored in blockchain 15 according to the present embodiment. FIG. 10 is specifically transaction data managed with blockchain 15 by management apparatuses 10A and others. One entry (one row) shown in FIG. 10 corresponds to one piece of transaction data. The data located in a lower portion of FIG. 10 is newer transaction data.

As illustrated in FIG. 10, each piece of transaction data includes the URL, the new version number, the base version number, and the software developer ID of each version of the software. The information in the transaction data illustrated in FIG. 10 corresponds to the information included in transaction data 40 illustrated in FIG. 7.

As illustrated in FIG. 10, blockchain 15 stores the information on the early versions of the software from the current point of time. Specifically, blockchain 15 stores the information indicating that versions 1.A1, 1.A2, and 1.A3 are developed from version 1 and that versions 1.B1 and 1.B2 are developed from version 1.

The information on the early versions of the software from the current point of time is managed by management apparatus 10A so as to prevent falsification, because the blockchain is difficult to falsify.

Processing of management system 1 will now be described.

Figure 11:
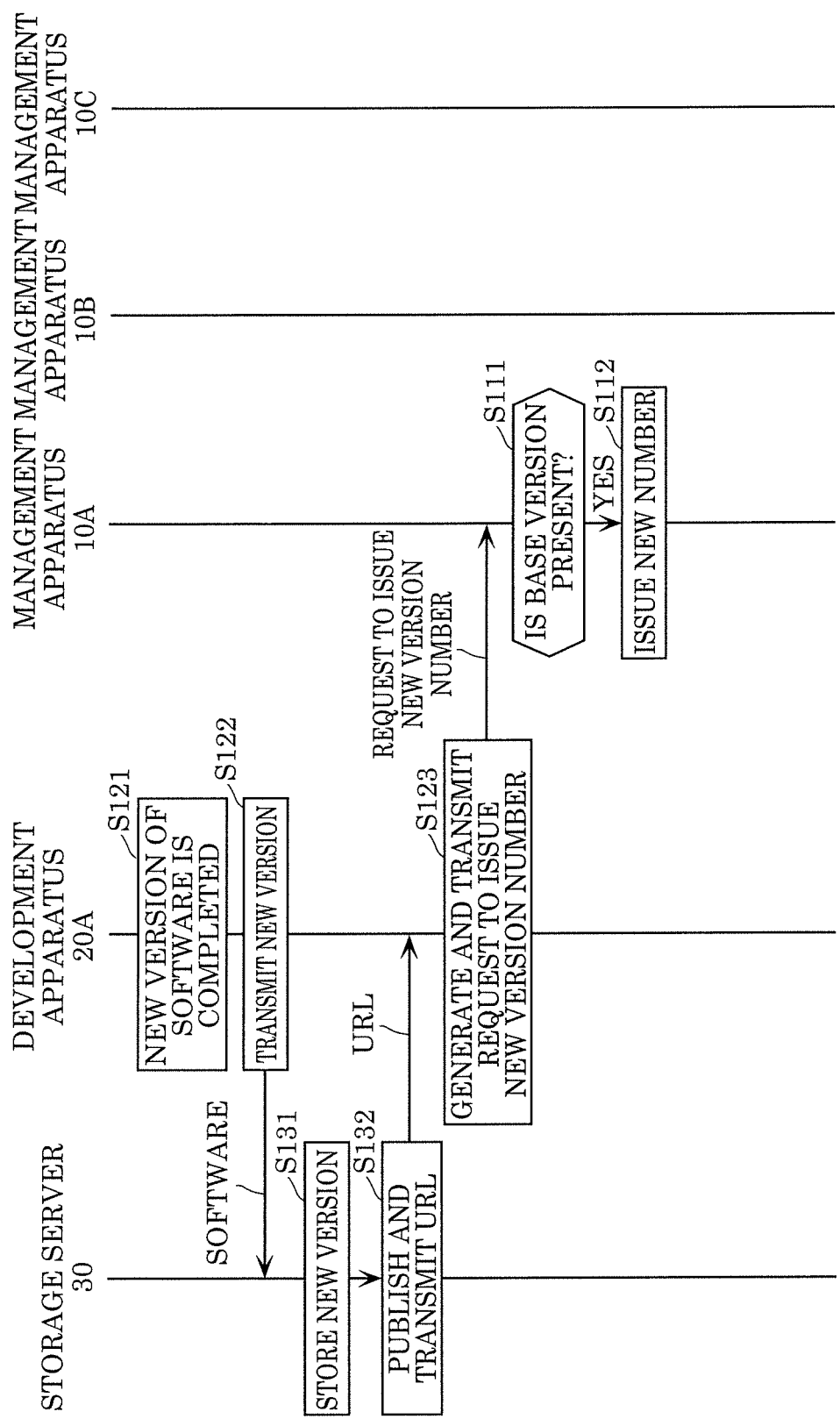
FIG. 11 is a sequence diagram illustrating first processing in the management system according to Embodiment 1.
Figure 12:
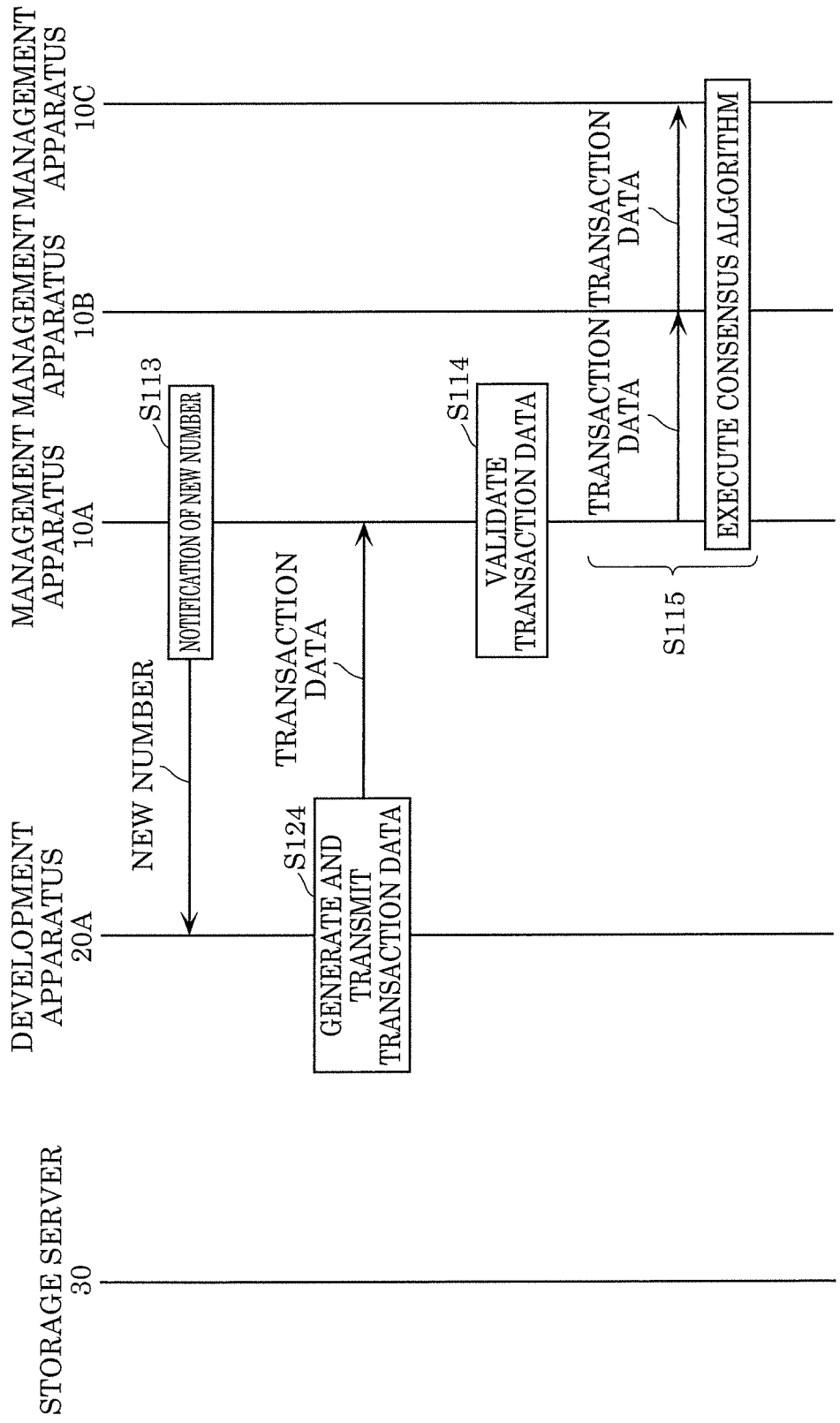
FIG. 12 is a sequence diagram illustrating second processing in the management system according to Embodiment 1.

FIGS. 11 and 12 are sequence diagrams illustrating first and second processings in management system 1 according to the present embodiment, respectively. FIGS. 11 and 12 illustrate a series of processing from the development of the new version of the software by development apparatus 20A to the management of the developed version of the software by management apparatuses 10A and others.

As illustrated in FIG. 11, in step S121, a new version of the software is completed by development apparatus 20A.

In step S122, development apparatus 20A transmits the new version of the software developed in step S121 to storage server 30 to store the new version of the software in storage server 30.

In step S131, storage server 30 receives the new version of the software transmitted from development apparatus 20A, and stores it in memory device 34.

In step S132, storage server 30 publishes an URL indicating the location of the new version of the software stored in step S131. Storage server 30 then transmits the published URL to development apparatus 20A. The URL can be transmitted as a reply to the software received in step S122.

In step S123, development apparatus 20A generates a request to issue a new version number (also referred to as new number), and transmits it to management apparatus 10A. Here, the request to issue a new version number is communication data for requesting the issuing of a new number to be assigned to the new version of the software (i.e., the new version number) to management apparatus 10A. The request includes at least the base version number.

In step S111, management apparatus 10A receives the request transmitted in step S123, and determines whether the base version included in the request is stored in blockchain 15 managed by management apparatus 10A. In the case where management apparatus 10A determines that the base version is stored in blockchain 15 (Yes in step S111), the processing goes to step S112.

In the case where management apparatus 10A determines that the base version is not stored in blockchain 15 (not illustrated), management apparatus 10A executes predetermined error processing (such as processing to transmit a notification indicating the failure of the issuing of the new number to development apparatus 20A), and terminates the processing. In this case, management apparatus 10A may terminate the processing without performing any processing. Management apparatus 10A determines that the base version is not stored in blockchain 15, for example, when management apparatuses 10A and others are caused to manage a version of software not managed by management apparatuses 10A and others.

In step S112, management apparatus 10A issues the version number of the new version.

Referring to FIG. 12, in step S113, management apparatus 10A notifies development apparatus 20A of the version number of the new version issued in step S112. The notification of the version number of the new version can be transmitted as a reply to the request to issue the new version number in step S123.

In step S124, transaction data for writing the new version in blockchain 15 is generated, and is transmitted to management apparatus 10A. This transaction data includes the new version number transmitted in step S113 or the information calculated using this new version number.

In step S114, management apparatus 10A validates the transaction data transmitted by development apparatus 20A in step S124. Here, assume that it is determined as a result of validation of the transaction data that the transaction data is legitimate.

In step S115, management apparatus 10A transmits the transaction data to management apparatuses 10B and 10C. The block including the transaction data is stored in blockchain 15 through execution of the consensus algorithm by management apparatuses 10A and others. Thus, the information on the new version of the software developed by the software developer, more specifically, the software developer ID and the version number are stored in blockchain 15, obstructing the falsification of the information after the storage thereof.

In the case where the validation of the transaction data is failed in step S114, that is, it is validated that the transaction data is not legitimate, development apparatus 20A may be notified of this failure. By this notification, the software developer can recognize and treat the failure. This notification does not need to be performed.

Management apparatus 10A may store the software itself in blockchain 15, and manage the software. Such an operation is more useful because not only the information on the version but also the software can be managed while the falsification of the software itself is also prevented. To do so, development apparatus 20A may generate the transaction data including the software itself (i.e., the program codes of the software), and transmit the transaction data to management apparatus 10A. Management apparatus 10A may store the received transaction data in blockchain 15.

Although development apparatus 20A has been described as one example of an apparatus connected to management apparatus 10A through a network, any apparatus other than development apparatus 20A may be used. For example, an apparatus used by an outside contractor of the software developer may also be the apparatus connected to management apparatus 10A through a network. The description above also applies to this case by replacing the "software developer" in the description above with the "outside contractor of the software developer".

As above, in the management method according to the present embodiment, the information on the software developer who has updated the version of the software is managed by the distributed ledger. The distributed ledger is advantageous in obstructing the falsification of the possessed information and in reducing influences by the system failures. Accordingly, the management method can prevent the falsification of the information under management.

Moreover, the version number of the new version is issued, and the information on the software developer of the new version is managed in correspondence with the issued version number. Failures such as duplication of the version number may occur when the version number is assigned by an apparatus different from the version management system. The management method according to the present disclosure can prevent such failures of the version number and prevent the falsification of the information under management.

The prevention in falsification of the information under management can be further facilitated using the version number of the first version, the hash value of the second version, and the version number of the second version.

The prevention in falsification of the information under management can be further facilitated using the hash value of the first version and the hash value of the second version.

The prevention in falsification of the information under management can be further facilitated using the hash value of the first version and the hash value of the difference between the first version and the second version.

Moreover, the information indicating the location where the software of the second version is stored is stored in the distributed ledger together with the information on the software developer. Accordingly, further, the falsification of the information under management can be prevented while the falsification of the information on the location where the second version is stored is also prevented.

Moreover, a token is provided to the software developer of the new version based on the transaction data so far. Because the falsification of the transaction data stored in the distributed ledger is difficult, provision of the tokens to an inappropriate person who spoofs the software developer can be prevented. Thus, the falsification of the information under management can be prevented, preventing inappropriate provision of the tokens.

Moreover, the prevention in falsification of the information under management can be further facilitated by using blockchains as distributed ledgers by management apparatuses.

Embodiment 2

In the present embodiment, a management method for software versions will be described, which prevents the falsification of the information under management. In particular, a technique of managing versions using different blockchains before and after major version upgrade of software during the major version upgrade will be described.

Here, the major version upgrade usually indicates version upgrade where a base version is subjected to relatively large modification or addition of functions. In contrast, the version upgrade from the first version to the second version described in Embodiment 1 is version upgrade where relatively small modification or addition of functions is performed, and is usually also referred to as minor version upgrade. The major version upgrade is performed based on a decision by Z Company, for example.

Figure 13:
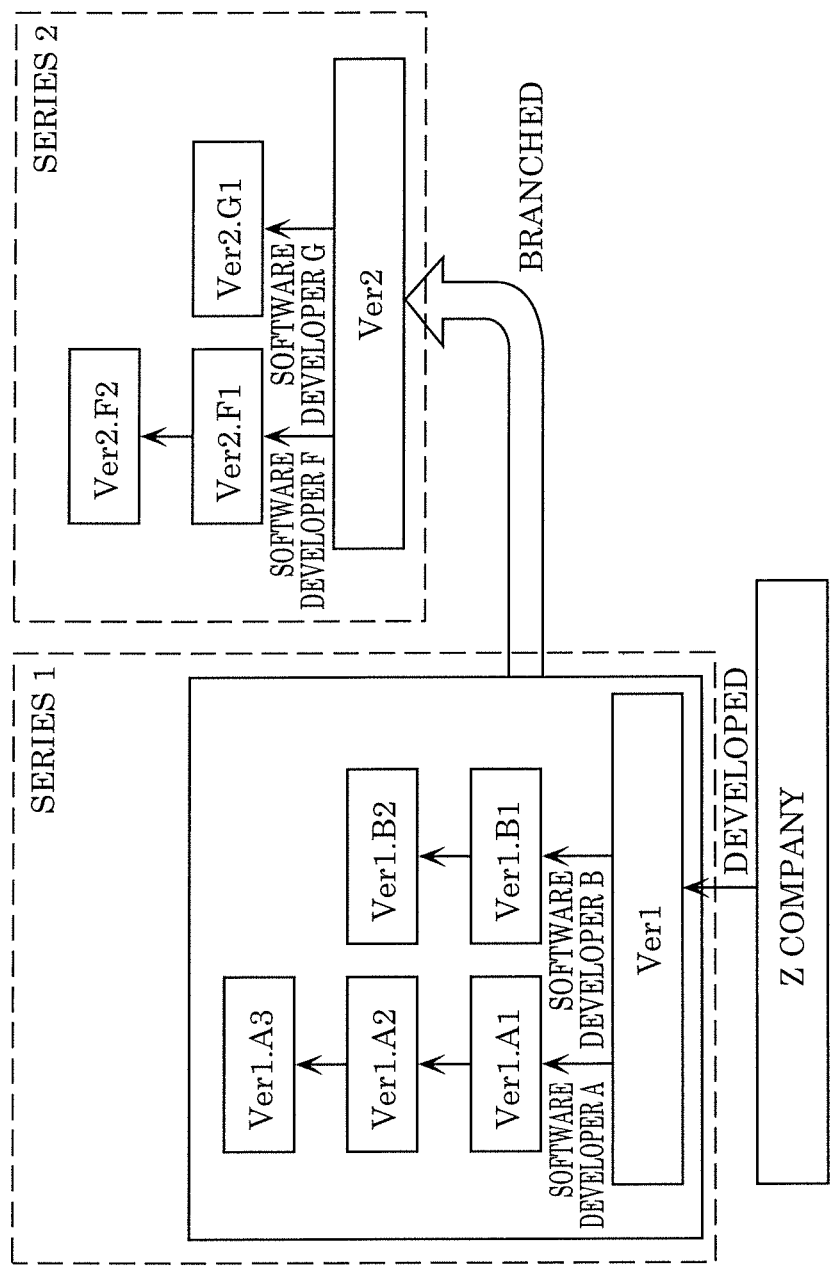
FIG. 13 is a diagram illustrating branching of a version series according to Embodiment 2.

FIG. 13 is a diagram illustrating branching of the version series according to the present embodiment.

Version 1 illustrated in FIG. 13 (represented as "Ver1" in FIG. 13) corresponds to the version of the software according to Embodiment 1. Here, the community of the software developer who has developed the software is referred to as "community of version 1".

When the major version upgrade is performed in the development of software, copies of series 1 developed in the community of version 1 are partially or entirely used as series 2 which is a new version series. At this time, a series of versions including at least the latest version of series 1 of the versions developed by the community of version 1 is used as series 2. A version series including all the versions of the version series developed by the community of version 1 may be used.

Such generation of a new series 2 from part of or entire series 1 is referred to as "branching of the series". In other words, the branching means generation of a new series 2 from part of or entire series 1.

Software developers belonging to the community of version 2 perform development based on the first version of series 2 ("Ver2" in FIG. 13) to generate a variety of version series. FIG. 13 illustrates that based on version 2 of the software, software developer F develops and generates version 2.F1, and software developer G develops and generates version 2.G1. Furthermore, version 2.F2 is developed from version 2.F1.

Figure 14:
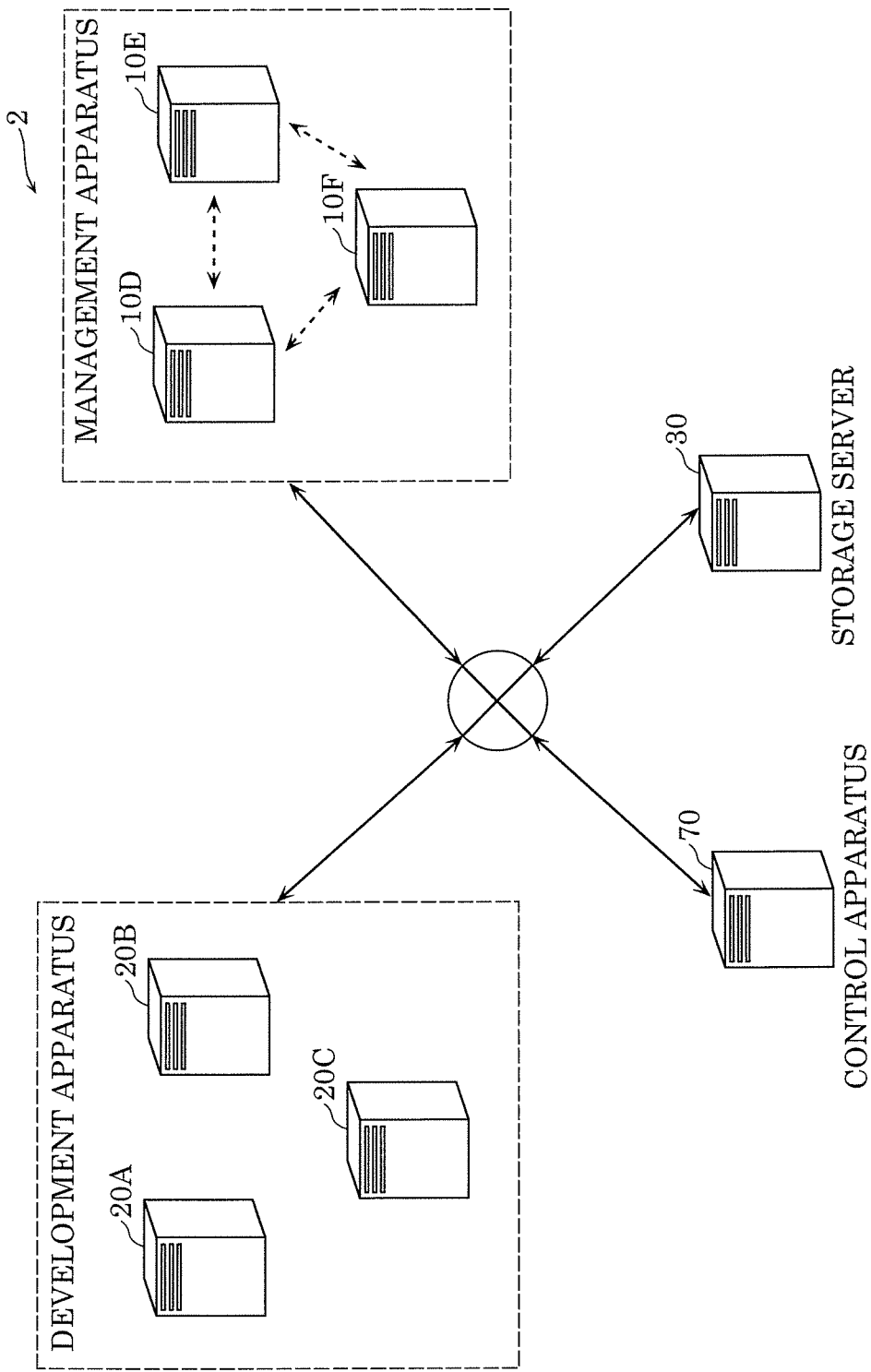
FIG. 14 is a diagram illustrating a configuration of a management system according to Embodiment 2.

FIG. 14 is a diagram illustrating a configuration of management system 2 according to the present embodiment.

As illustrated in FIG. 14, management system 2 includes management apparatuses 10D, 10E, and 10F, development apparatuses 20A and others, storage server 30, and control apparatus 70. Development apparatuses 20A and others and storage server 30 are the same as those in Embodiment 1, and their description will be omitted.

Control apparatus 70 controls and causes management apparatuses 10D and others to branch the version series. Control apparatus 70 specifically transmits, as the control, communication data including an instruction to branch the version series. This communication data can be transmitted based on an operation performed on control apparatus 70 by a user.

Similarly to management apparatuses 10A and others in Embodiment 1, management apparatuses 10D, 10E, and 10F (also referred to as 10D and others) manage the version information using computers. Management apparatuses 10D and others have the functions equivalent to those of management apparatuses 10A and others, and further have a function to create the branch of the version series based on the branching instruction transmitted from control apparatus 70.

Figure 15:
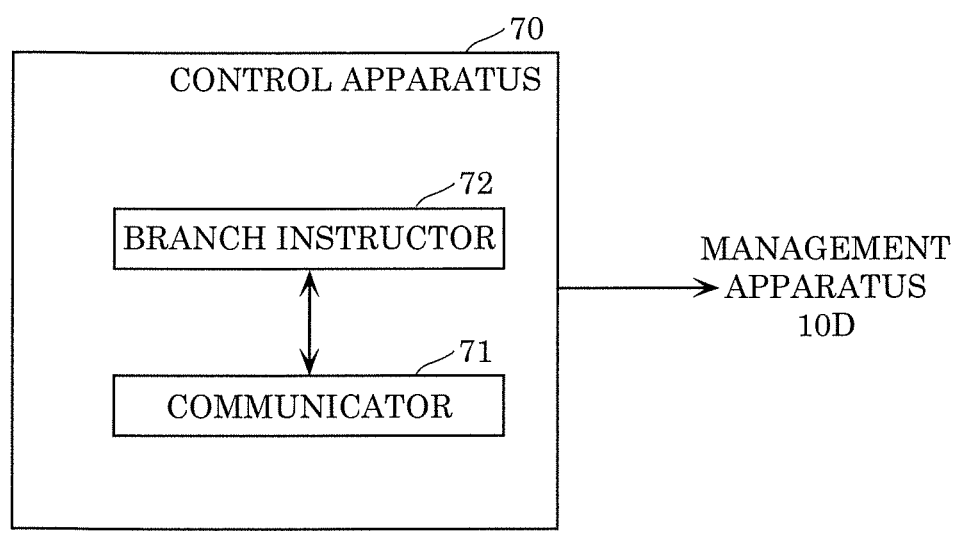
FIG. 15 is a block diagram illustrating a configuration of a control apparatus according to Embodiment 2.

FIG. 15 is a block diagram illustrating a configuration of control apparatus 70 according to the present embodiment.

As illustrated in FIG. 15, control apparatus 70 includes communicator 71 and branch instructor 72.

Communicator 71 is a communication interface device connected to network N. Control apparatus 70 can communicate with management apparatus 10D through communicator 71. The functions included in control apparatus 70 can be implemented by a processor which executes a predetermined program using a memory.

Branching instructor 72 is a processor which transmits an instruction (branching instruction) to cause management apparatus 10D to branch the series through communicator 71. The branching instruction includes at least information for specifying the underlying version series for the branching.

Figure 16:
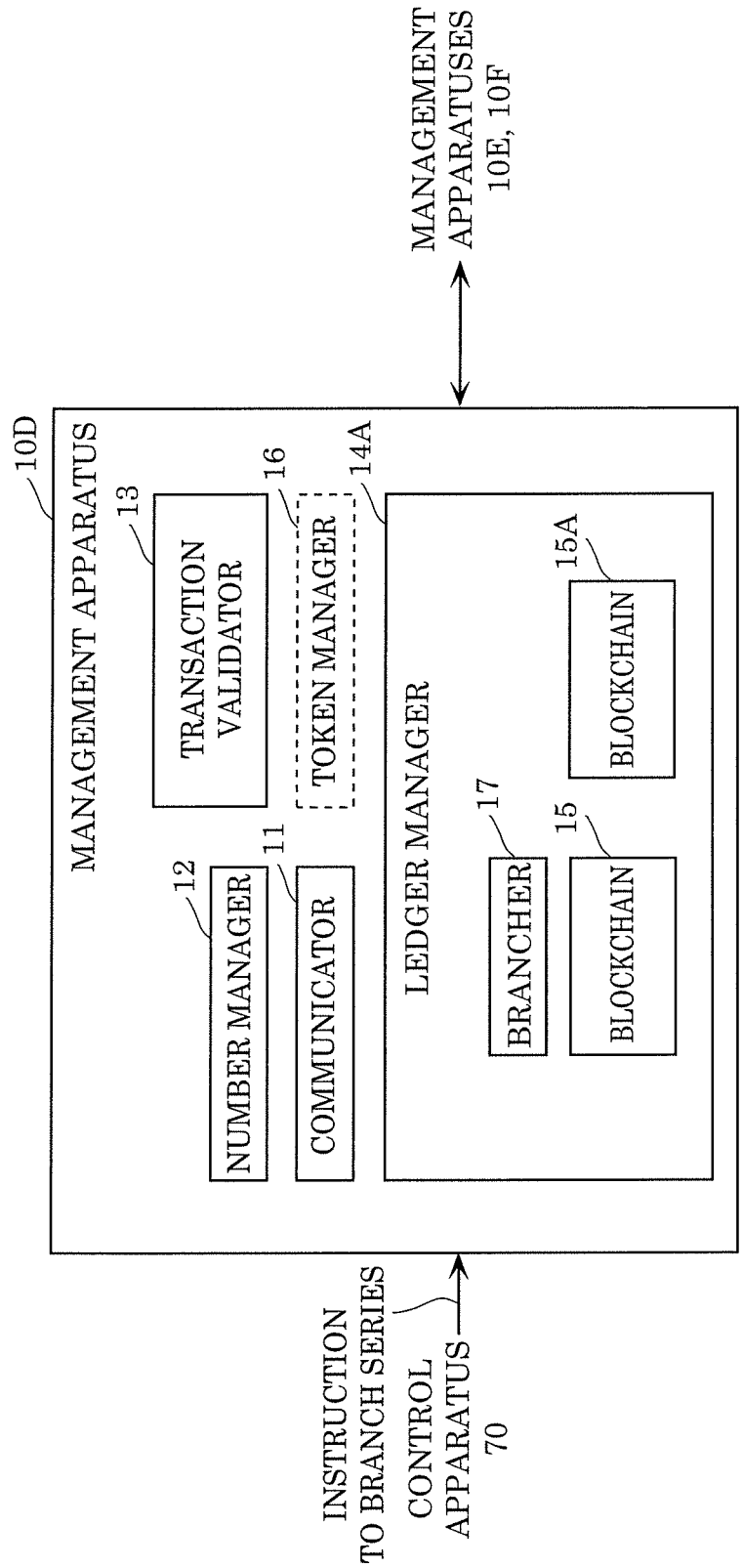
FIG. 16 is a block diagram illustrating a configuration of a management apparatus according to Embodiment 2.

FIG. 16 is a block diagram illustrating a configuration of management apparatus 10D according to the present embodiment.

As illustrated in FIG. 16, management apparatus 10D includes communicator 11, number manager 12, transaction validator 13, and ledger manager 14A. The functions included in management apparatus 10D may be implemented by a processor which executes a predetermined program using a memory.

Unlike management apparatus 10A in Embodiment 1, management apparatus 10D includes ledger manager 14A. Ledger manager 14A will now be mainly described.

Ledger manager 14A includes brancher 17. In addition to blockchain 15, ledger manager 14A may include blockchain 15A.

Brancher 17 is a processor which branches the version series of the software to create a new series. Brancher 17 receives the communication data including the branching instruction transmitted by control apparatus 70 through communicator 11, and creates the branch of the version series of the software in response to the reception of the communication data. At this time, brancher 17 branches the version series by generating blockchain 15A. Blockchain 15A corresponds to the new version series which possesses copies of one or more versions including at least the latest version in blockchain 15 corresponding to the version series subjected to version upgrade.

After branching of the version series, transaction validator 13, when receiving the transaction data, specifies whether the transaction data is derived from the first version series or the second version series, and stores the received transaction data in the distributed ledger corresponding to the version series corresponding to the specified transaction data among the first version series and the second version series.

Blockchains 15 and 15A managed by ledger manager 14A according to the present embodiment will now be described.

FIGS. 17 and 18 are diagrams illustrating transaction data stored in blockchains 15 and 15A according to the present embodiment. Specifically, the transaction data illustrated in FIG. 17 is stored in blockchain 15 corresponding to series 1 which is the version series including version 1. The transaction data illustrated in FIG. 18 is stored in blockchain 15A corresponding to series 2 which is the version series including version 2.

As illustrated in FIG. 17, similarly to blockchain 15 illustrated in FIG. 10, the transaction data included in blockchain 15 corresponding to series 1 includes the URLs, new version numbers, base version numbers, and software developer IDs of all the versions of the software. Specifically, blockchain 15 includes the information above on versions 1.A1, 1.A2, and 1.B1.

As illustrated in FIG. 18, similarly to blockchain 15 included in FIG. 10, the transaction data included in blockchain 15A corresponding to series 2 includes the URLs, new version numbers, base version numbers, and software developer IDs of all the versions of the software. Specifically, blockchain 15A includes the information above on versions 2.D1, 2.D2, and 2.E1.

Processing of management system 2 will now be described.

Figure 19:
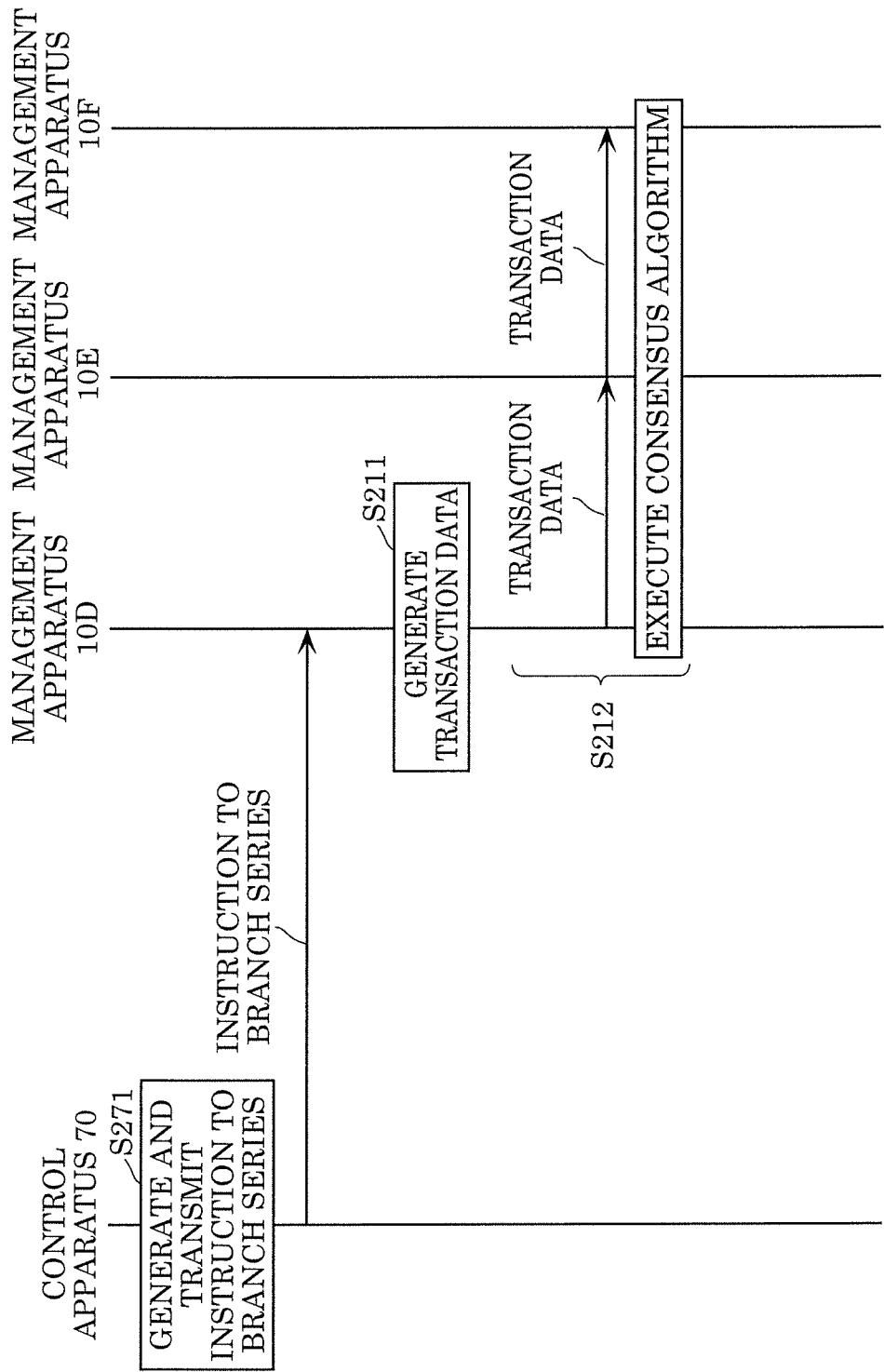
FIG. 19 is a sequence diagram illustrating processing in the management system according to Embodiment 2.

FIG. 19 is a sequence diagram illustrating processing in management system 2 according to the present embodiment.

As illustrated in FIG. 19, when Z Company decides to branch the version series in step S271, control apparatus 70 generates communication data including a branching instruction, and transmits it to management apparatus 10D.

In step S211, when receiving the branching instruction transmitted in step S271, management apparatus 10D generates transaction data for generating a blockchain corresponding to a new version series (corresponding to blockchain 15A in FIG. 16).

In step S212, management apparatus 10D transmits the transaction data generated in step S211 to management apparatuses 10E and 10F. A block including the transaction data is then stored in a blockchain through execution of a consensus algorithm by management apparatuses 10D and others. Thereby, the information on the new version of the software corresponding to the new version series, more specifically, the software developer ID and the version number are stored in the blockchains, obstructing the falsification of the information after the storage thereof.

Management of the new version when blockchains corresponding to several version series are managed by management apparatuses 10D and others will now be described.

Figure 20:
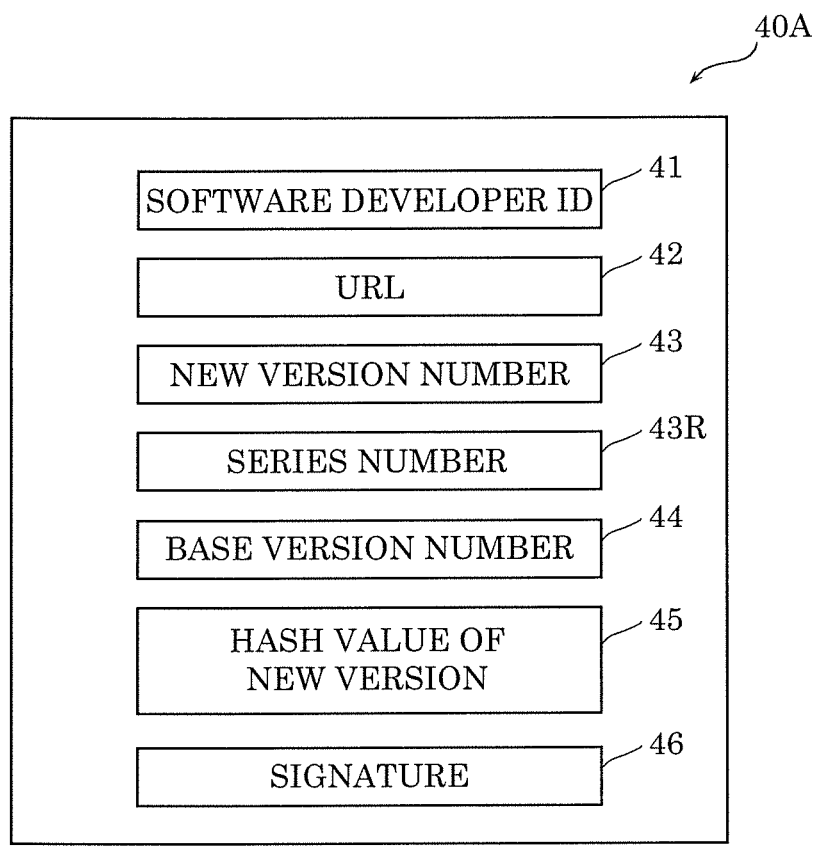
FIG. 20 is a diagram illustrating an example of transaction data according to Embodiment 2.

FIG. 20 is a diagram illustrating transaction data 40A, which is an example of the transaction data according to the present embodiment.

Transaction data 40A includes transaction data 40 illustrated in FIG. 7, and further includes series number 43A.

Series number 43A is the information indicating the series of the new version to be newly managed according to transaction data 40A.

Signature 46 is an electronic signature generated from the information included in transaction data 40A through encryption with the private key of the software developer. The information underlying the generation of signature 46 also includes series number 43A in addition to the information underlying the generation of signature 46 in FIG. 7.

In the case where several series are present, development apparatus 20A transmits transaction data 40A to management apparatus 10D, where transaction data 40A includes series number 43A indicating the series to which the new version of the software belongs. When receiving transaction data 40A, management apparatus 10D obtains the series number included in transaction data 40A received, and stores transaction data 40A in the blockchain corresponding to the series number.

Figure 21:
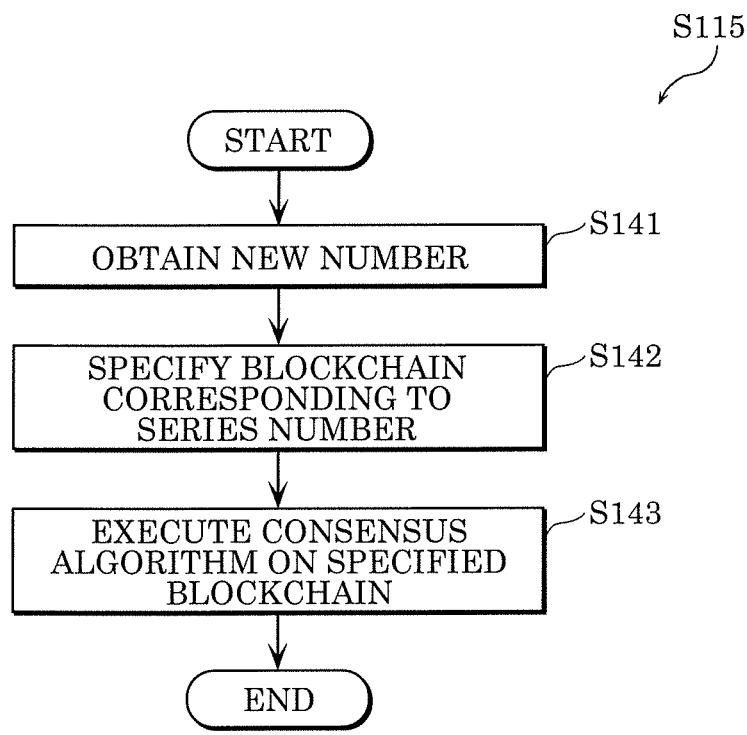
FIG. 21 is a flowchart illustrating processing related with a version series included in a consensus algorithm according to Embodiment 2.

FIG. 21 is a flowchart illustrating processing performed on the version series included in the consensus algorithm according to the present embodiment. The processing illustrated in FIG. 21 is included in the consensus algorithm in step S115 of FIG. 12.

In step S141, management apparatus 10D obtains the series number included in transaction data 40A received.

In step S142, management apparatus 10D specifies the blockchain corresponding to the series number obtained in step S141 among the blockchains managed by ledger manager 14A.

In step S143, the consensus algorithm is executed on the blockchain specified in step S142 between management apparatus 10D and management apparatuses 10E and 10F. Thereby, transaction data 40A received is stored in the blockchain specified in step S142.

Thus, the transaction data is stored in the blockchain corresponding to the series number specified by development apparatus 20A.

As above, the management method according to the present embodiment manages the distributed ledgers corresponding to several version series, and generates a distributed ledger corresponding to a new series during branching of the version series. When a large number of version upgrades are performed in one series, the information corresponding to those version upgrades may be obtained when the information such as the history of version upgrade is obtained, increasing the processing load. In such a case, the version series is branched, and the new version series is managed by the new distributed ledger, thereby reducing the information such as the history of version upgrade and preventing the increase in processing load.

When several version series are managed by several distributed ledgers, the version series to which the transaction data belongs can be specified, and the transaction data can be managed by its appropriate distributed ledger.

Embodiment 3

In the present embodiment, a management method for software versions will be described, which prevents the falsification of the information under management. In particular, a technique of managing versions so as to stop use of the version series of the software will be described. Stop of use of the version series is also referred to as removal of the version series.

Figure 22:
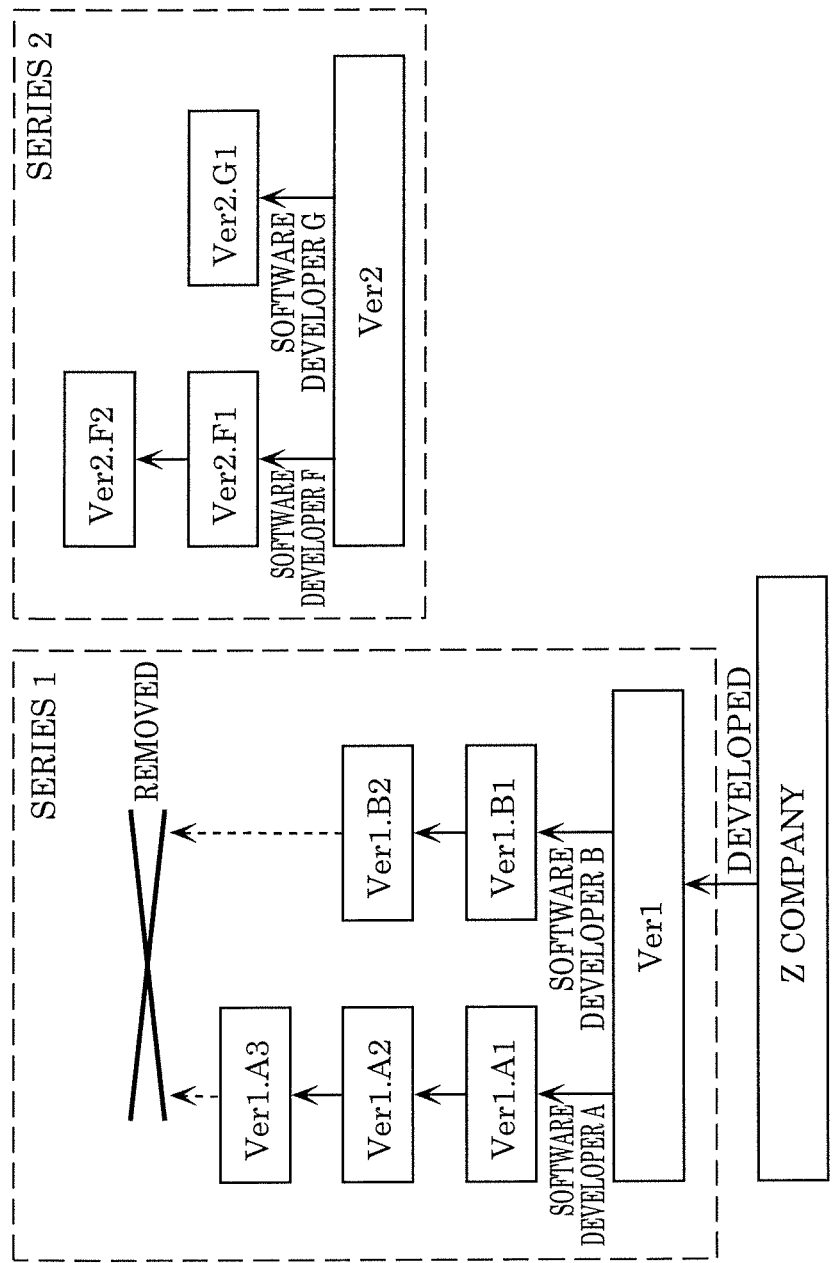
FIG. 22 is a diagram illustrating removal of a version series according to Embodiment 3.

FIG. 22 is a diagram illustrating removal of a version series according to the present embodiment.

Ver1 and Ver2 illustrated in FIG. 22 correspond to the versions of software according to Embodiment 2, respectively.

In the development of software, use of relatively old version series of the program is stopped, that is, those are removed because relatively new version series thereof are generated. The removed version series are controlled such that the version upgrade of the program after the removal is prohibited. The removed version series may be further controlled such that the software of the versions included in the removed series is prohibited from being provided to users after the removal of the version series.

Specifically, as illustrated in FIG. 22, assume that series 1 is removed when the latest version 1.A3 of the version series of version 1.A and the latest version 1.B2 of the version series of version 1.B are present. Then, the registration of the next version 1.A4 (not illustrated) which may be included in the version series of version 1.A or the next version 1.B3 (not illustrated) which may be included in the version series of version 1.B is prohibited, for example. In addition, the software of the series of version 1, version 1.A, and version 1.B is prohibited from being provided to users after the removal of series 1.

Management system 2 according to the present embodiment is similar to management system 2 in Embodiment 2, and has functions of the control apparatus and the management apparatus, some of which are different from those in management system 2 in Embodiment 2. Specifically, management system 2 according to the present embodiment includes control apparatus 70A, and management apparatuses 10G, 10H, and 10I (also referred to as 10G and others).

Control apparatus 70A and management apparatus 10G according to the present embodiment will now be described in detail.

Figure 23:
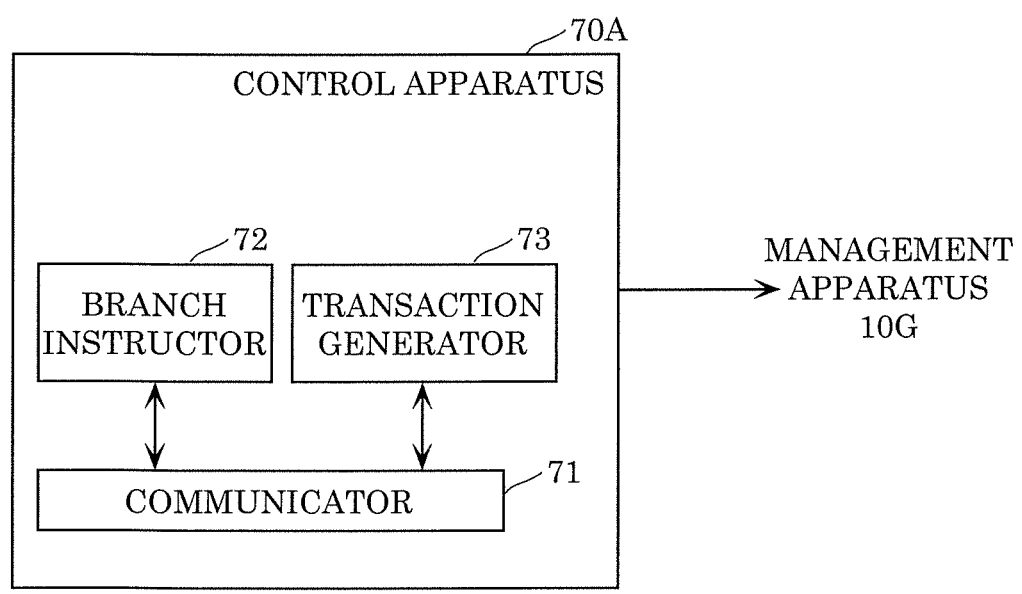
FIG. 23 is a block diagram illustrating a configuration of a control apparatus according to Embodiment 3.

FIG. 23 is a block diagram illustrating a configuration of control apparatus 70A according to the present embodiment.

As illustrated in FIG. 23, control apparatus 70A includes communicator 71 and transaction generator 73. Control apparatus 70A may include branch instructor 72 as in control apparatus 70 according to Embodiment 2.

Communicator 71 is the same as communicator 71 included in control apparatus 70A according to Embodiment 2.

Transaction generator 73 is a processor which generates transaction data indicating the removal of the version series. Transaction generator 73 transmits the generated transaction data to management apparatus 10G. The transaction data includes at least a series number as specification information which can specify the version series to be removed.

Figure 24:
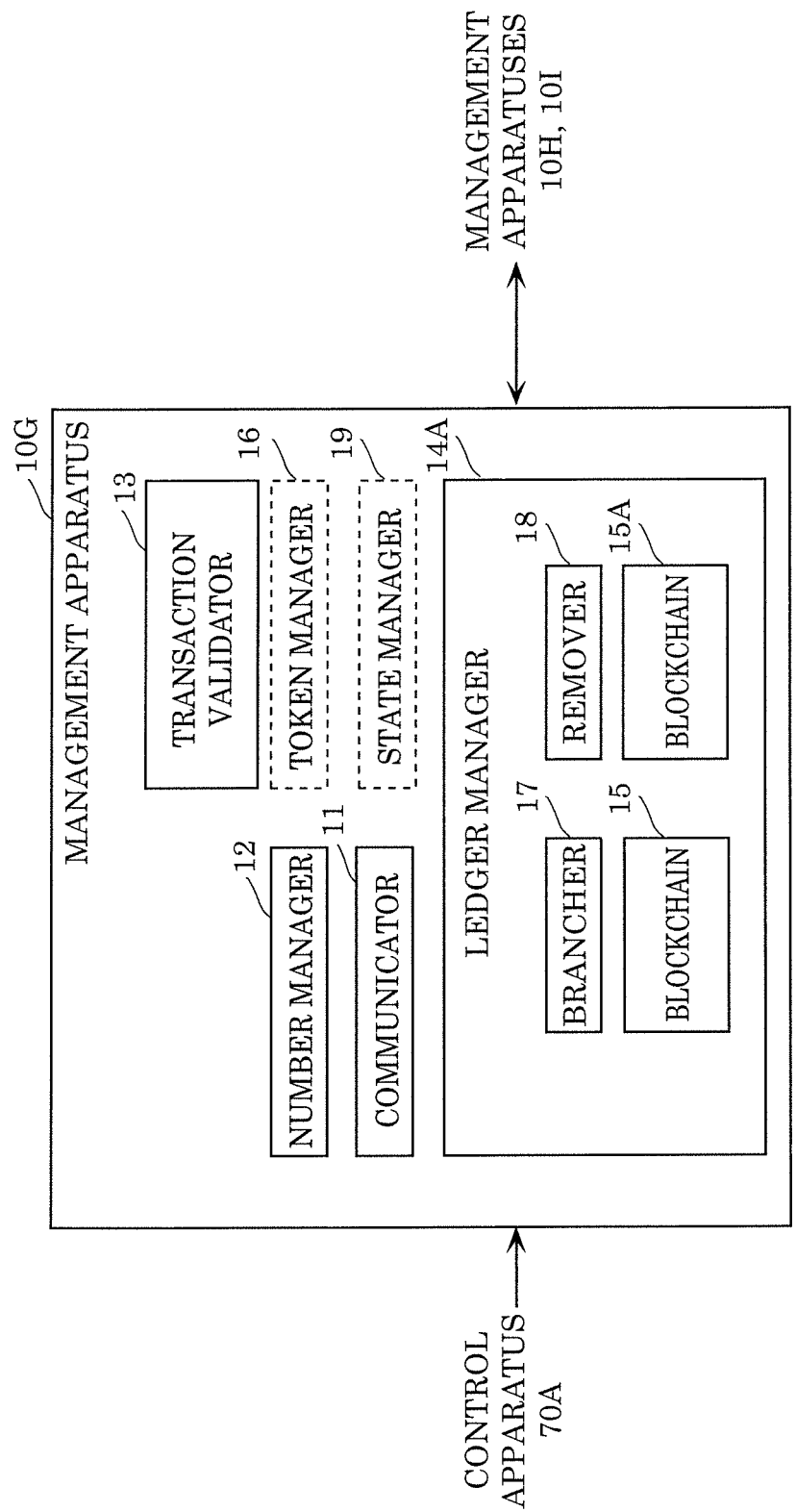
FIG. 24 is a block diagram illustrating a configuration of a management apparatus according to Embodiment 3.

FIG. 24 is a block diagram illustrating a configuration of management apparatus 10G according to the present embodiment.

As illustrated in FIG. 24, management apparatus 10G includes communicator 11, number manager 12, transaction validator 13, ledger manager 14A, and remover 18. Management apparatus 10G may include state manager 19. The functions included in management apparatus 10G may be implemented by a processor which executes a predetermined program using a memory.

Unlike management apparatus 10A in Embodiment 1 and management apparatus 10D in Embodiment 2, management apparatus 10G may include remover 18 and state manager 19. Remover 18 and state manager 19 will now be mainly described.

Remover 18 is a processor which stores a block in a blockchain corresponding to the version series to be removed, the block including information indicating the removal of the version series. Remover 18 receives the transaction data transmitted from control apparatus 70A, the transaction data indicating the removal of the version series. Remover 18 stores the transaction data in the blockchain corresponding to the version series specified by the series number included in the received transaction data.

State manager 19 is a processor which manages the information indicating whether the version series are operated or removed. State manager 19 possesses the information indicating that the version series managed by management apparatus 10G are operated or removed. When remover 18 stores the transaction data to remove the version series in the blockchain, state manager 19 changes the state of the version series from operated to removed. State manager 19 is not an essential configuration.

Figure 25:
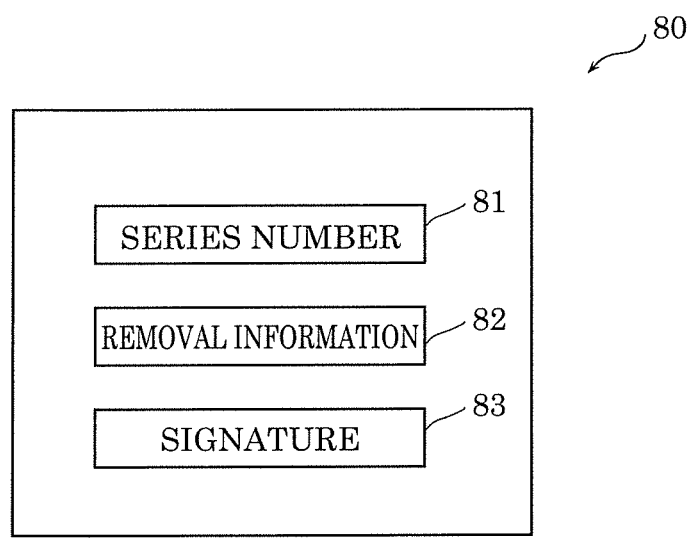
FIG. 25 is a diagram illustrating an example of transaction data according to Embodiment 3.

FIG. 25 is a diagram illustrating transaction data 80 as an example of the transaction data according to the present embodiment.

As illustrated in FIG. 25, transaction data 80 includes series number 81, removal information 82, and signature 83.

Series number 81 is the information for specifying the version series to be removed according to transaction data 80.

Removal information 82 is the information indicating that transaction data 80 means the removal of the version series.

Signature 83 is an electronic signature generated from the information included in transaction data 80 through encryption with the private key of control apparatus 70A. Specifically, signature 83 is a value obtained as follows: A hash value is obtained by performing a hash operation on the information including series number 81 and removal information 82, and is encrypted with the private key of control apparatus 70A.

FIG. 26 is a diagram illustrating the transaction data stored in a blockchain according to the present embodiment. Specifically, the transaction data illustrated in FIG. 26 is blockchain 15 corresponding to the version series of version 1.

As illustrated in FIG. 26, similarly to blockchain 15 included in FIG. 10, the transaction data included in blockchain 15 corresponding to the version series of version 1 includes the URLs, new version numbers, base version numbers, and software developer IDs of the versions of the software. Specifically, blockchain 15 includes the information above on versions 1.A1, 1.A2, and 1.B1.

Transaction data 91 included in blockchain 15 is the transaction data for removing version series 1A. Transaction data 92 included in blockchain 15 is the transaction data for removing version series 1B.

Figure 27:
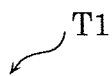
FIG. 27 is a diagram illustrating information managed by a state manager according to Embodiment 3.

FIG. 27 is a diagram illustrating state table T1 indicating the state information managed by state manager 19 according to the present embodiment.

As illustrated in FIG. 27, state table T1 has the information indicating the states of version series 1A and 1B. FIG. 27 illustrates that version series 1A is removed and version series 1B is operated. This corresponds to the case where ledger manager 14A possesses the blockchains corresponding to the series of version 1 and that of version 2, the series of version 1 is removed, and the series of version 2 is operated.

Processing of management system 2 will now be described.

Figure 28:
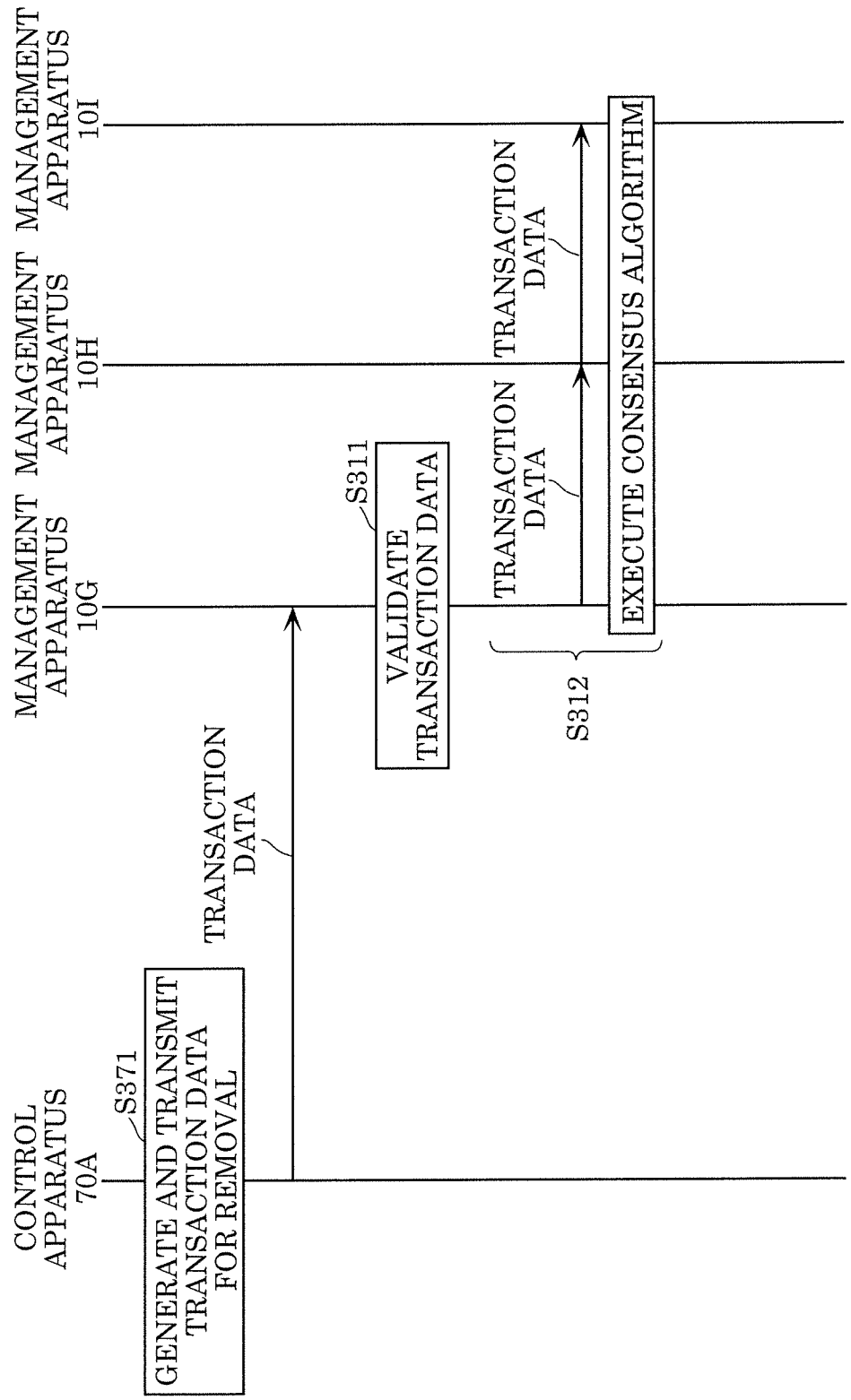
FIG. 28 is a sequence diagram illustrating processing in the management system according to Embodiment 3.

FIG. 28 is a sequence diagram illustrating processing in management system 2 according to the present embodiment.

As illustrated in FIG. 28, in step S371, control apparatus 70A generates the transaction data to remove the version series, and transmits it to management apparatus 10G.

In step S311, management apparatus 10G receives the transaction data transmitted in step S371, and validates the received transaction data. The transaction data is validated with the information included in the transaction data and the public key of control apparatus 70A. Here, assume that as a result of the validation of the transaction data, it is determined that the transaction data is legitimate.

In step S312, management apparatus 10G transmits the transaction data generated in step S312 to management apparatuses 10H and 10I. A block including the transaction data is stored in a blockchain through execution of the consensus algorithm by management apparatus 10G and others. Thereby, the information indicating the removal of the version series is stored in the blockchain, obstructing the falsification thereafter. Thereafter, connection of the block to the blockchain corresponding to the removed version series is then prohibited, and the software included in the removed version series is also prohibited from being provided.

In the case where the validation of the transaction data is failed in step S311, that is, it is validated that the transaction data is not legitimate, control apparatus 70A may be notified of this failure. By this notification, the operator of control apparatus 70A can recognize and treat the failure. This notification does not need to be performed.

When receiving a request to issue a new version number from development apparatus 20A on the version series already removed, management apparatus 10G may transmit a notification indicating that the version series is already removed. Alternatively, when management apparatus 10G removes the version series, token manager 16 may provide a token to the software developer of the version included in the removed version series. This token means a reward or an advance payment.

The blockchain in the embodiments above will be complementally described.

Figure 29:
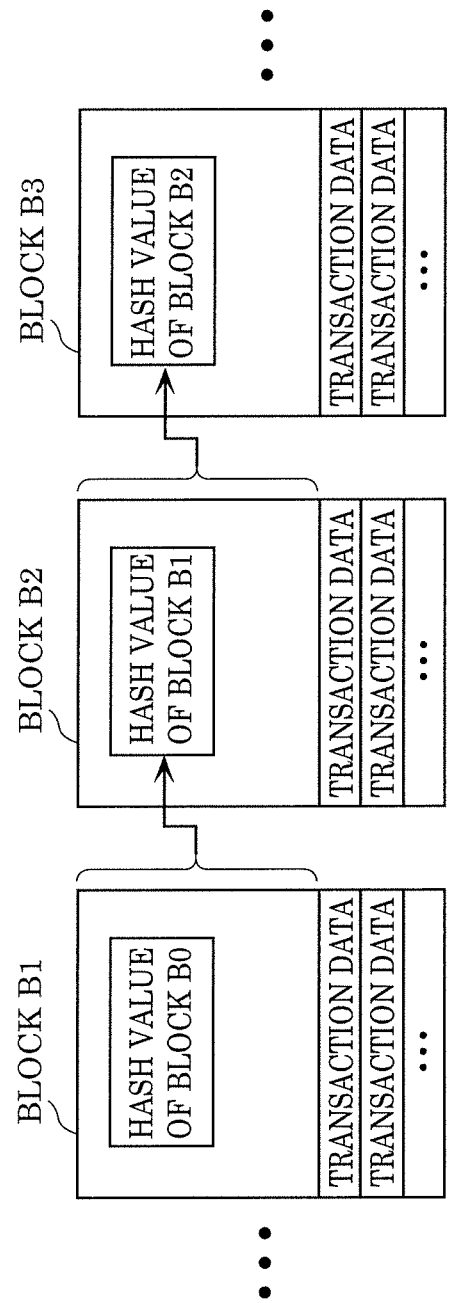
FIG. 29 is a diagram illustrating a data structure of a blockchain.

FIG. 29 is a diagram illustrating a data structure of the blockchain.

The blockchain is composed of blocks (recording unit) connected on a chain. One block has pieces of transaction data and the hash value of a block immediately before the one block. Specifically, block B2 includes the hash value of block B1 immediately before block B2. The hash value obtained from an arithmetic operation performed on the pieces of transaction data included in block B2 and the hash value of block B1 is included in block B3 as the hash value of block B2. Thus, the blocks are connected into a chain while the contents of the previous blocks are included as hash values, thereby effectively preventing the falsification of the recorded transaction data.

Any change in the transaction data in the past will result in a hash value of the block different from that before the change. To look the falsified block legitimate, all the blocks thereafter should be regenerated. This regeneration is very difficult in reality. Such properties ensure the difficulties in falsification of the blockchain.

Figure 30:
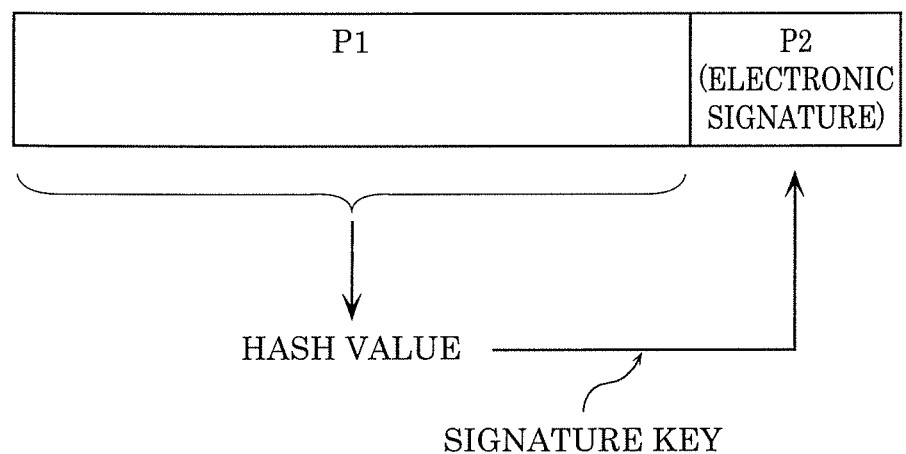
FIG. 30 is a diagram illustrating a data structure of transaction data.

FIG. 30 is a diagram illustrating a data structure of the transaction data.

The transaction data illustrated in FIG. 30 includes transaction body P1 and electronic signature P2. Transaction body P1 is a body of data included in the transaction data. Electronic signature P2 is generated by signing on the hash value of transaction body P1 with the signature key of the creator of the transaction data, more specifically, encrypting the hash value with the private key of the creator.

Because the transaction data has electronic signature P2, the falsification is substantially impossible. Thus, electronic signature P2 prevents the falsification of the transaction body.

As described above, in the management method according to the present embodiment, the version series can be appropriately removed using the predetermined transaction data. Accordingly, the prevention in falsification of the information under management can be further facilitated while the removal of the version series is further implemented.

In the embodiments above, the components may be implemented as dedicated hardware, or may be implemented by executing software programs suitable for the components. The components each may be implemented by a program executer, such as a CPU or a processor, which reads and executes the software program recorded on a recording medium, such as a hard disk or a semiconductor memory. Here, the management apparatus and the like in the embodiments are implemented with the following software program.

That is, this program is a program causing a computer to execute a management method for software versions to be executed by a version management system. The version management system includes management apparatuses having distributed ledgers. The management method includes receiving, by a first management apparatus among the management apparatuses, transaction data from an apparatus connected through a network to the first management apparatus, the transaction data including first information on a first version of software, second information on a second version of the software subjected to version upgrade from the first version by a software developer, identification information of the software developer, and an electronic signature; validating, by the first management apparatus, legitimacy of the transaction data using the electronic signature included in the transaction data received; and storing, by each of the management apparatuses, the transaction data in a corresponding distributed ledger among the distributed ledgers when the transaction data is legitimate.

Although the management methods according to one or more aspects have been described based on the embodiments, these embodiments should not be construed as limitation to the present disclosure. A variety of modifications of the present embodiments conceived by persons skilled in the art and embodiments in combination with components in different embodiments may also be included in the scope of one or more aspects without departing from the gist of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is a management method for software versions, and can be used in a management system which prevents falsification of information under management.

What is claimed is:

1. A management method for software versions, the management method to be executed by a version management system, the management method comprising:
receiving, by a first management apparatus among a plurality of management apparatuses which are included in the version management system and having a plurality of distributed ledgers including a first distributed ledger and a second distributed ledger, transaction data, specified as derived from a first version series or a second version series branched from the first version series, from a software development apparatus connected through a network to the first management apparatus, the transaction data including:
(i) first information on a first version of software developed by a software developer using the software development apparatus,
(ii) second information on a second version of the software developed by the software developer using the software development apparatus, the second version of the software being an upgraded version of the first version of the software,
(iii) identification information of the software developer, and
(iv) an electronic signature of the software developer;
validating, by the first management apparatus, legitimacy of the transaction data using the electronic signature of the software developer included in the transaction data received; and
storing, by each of the management apparatuses, the transaction data in a distributed ledger corresponding to a version series of the transaction data specified, among the first version series and the second version series, when the transaction data is legitimate, the transaction data including the first information, the second information, the identification information, and the electronic signature.

2. The management method according to claim 1, wherein the second information includes a version number of the second version, and
the management method further comprises:
transmitting a new version number to the software development apparatus as the version number of the second version when a request to issue the version number of the second version has been received from the software development apparatus before the receiving; and
receiving transaction data including, as the second information, the new version number transmitted to the software development apparatus in the receiving.

3. The management method according to claim 1, wherein the first information includes a version number of the first version, and
the second information includes a hash value of the second version and the version number of the second version.

4. The management method according to claim 1, wherein the first information includes a hash value of the first version, and
the second information includes a hash value of the second version.

5. The management method according to claim 1, wherein the first information includes a hash value of the first version, and
the second information includes a hash value of a difference between the first version and the second version.

6. The management method according to claim 1, wherein the software development apparatus possesses location information indicating a location where the second version is stored, and
in the management method,
transaction data including the location information is received in the receiving.

7. The management method according to claim 1, further comprising:
generating transaction data indicating removal of one version series when removing the one version series, and storing the transaction data generated in a distributed ledger corresponding to the one version series.

8. The management method according to claim 1, further comprising:
providing a token to the software developer with reference to the transaction data stored in the distributed ledger.

9. The management method according to claim 1, wherein the distributed ledgers are blockchains, and
when the transaction data is legitimate, the management apparatuses store the transaction data in the blockchains.

10. A management apparatus which is a first management apparatus among a plurality of management apparatuses which are included in a version management system for managing software versions and having a plurality of distributed ledgers including a first distributed ledger and a second distributed ledger, the management apparatus comprising:
a processor; and
a non-transitory computer-readable medium having stored thereon executable instructions that, when executed by the processor, cause the first management apparatus to function as:

a transaction validator which:
   receives transaction data, specified as derived from a first version series or a second version series branched from the first version series, from a software development apparatus connected through a network to the first management apparatus, the transaction data including:
      (i) first information on a first version of software developed by a software developer using the software development apparatus,
      (ii) second information on a second version of the software developed by the software developer using the software development apparatus, the second version of the software being an upgraded version of the first version of the software,
      (iii) identification information of the software developer, and
      (iv) an electronic signature of the software developer, and
   validates legitimacy of the transaction data using the electronic signature of the software developer included in the transaction data received; and
a ledger manager which stores the transaction data in the distributed ledger corresponding to a version series of the transaction data specified, among the first version series and the second version series, when the transaction data is legitimate, the transaction data including the first information, the second information, the identification information, and the electronic signature.

11. A non-transitory computer-readable recording medium which stores a program for operating a computer as a first management apparatus among management apparatuses which are included in a version management system for managing software versions and having a plurality of distributed ledgers including a first distributed ledger and a second distributed ledger, the program causing the computer to execute:
   receiving transaction data, specified as derived from a first version series or a second version series branched from the first version series, from a software development apparatus connected through a network to the first management apparatus, the transaction data including:
      (i) first information on a first version of software developed by a software developer using the software development apparatus,
      (ii) second information on a second version of the software developed by the software developer using the software development apparatus, the second version of the software being an upgraded version of the first version of the software,
      (iii) identification information of the software developer, and
      (iv) an electronic signature of the software developer;
   validating legitimacy of the transaction data using the electronic signature of the software developer included in the transaction data received; and
   storing the transaction data in the distributed ledger corresponding to a version series of the transaction data specified, among the first version series and the second version series, when the transaction data is legitimate, the transaction data including the first information, the second information, the identification information, and the electronic signature.

* * * * *